US010306112B2

(12) United States Patent
Okamoto

(10) Patent No.: US 10,306,112 B2
(45) Date of Patent: May 28, 2019

(54) INFORMATION PROCESSING DEVICE, INFORMATION PROCESSING METHOD, AND PROGRAM

(71) Applicant: Sony Corporation, Tokyo (JP)

(72) Inventor: Keiji Okamoto, Chiba (JP)

(73) Assignee: Sony Corporation, Tokyo (JP)

( * ) Notice: Subject to any disclaimer, the term of this patent is extended or adjusted under 35 U.S.C. 154(b) by 85 days.

(21) Appl. No.: 15/031,087

(22) PCT Filed: Dec. 17, 2014

(86) PCT No.: PCT/JP2014/006311
§ 371 (c)(1),
(2) Date: Apr. 21, 2016

(87) PCT Pub. No.: WO2015/098051
PCT Pub. Date: Jul. 2, 2015

(65) Prior Publication Data
US 2016/0248964 A1 Aug. 25, 2016

(30) Foreign Application Priority Data
Dec. 27, 2013 (JP) ................... 2013-273519

(51) Int. Cl.
*G06F 1/16* (2006.01)
*H04N 21/462* (2011.01)
(Continued)

(52) U.S. Cl.
CPC ........... *H04N 5/2252* (2013.01); *G03B 17/20* (2013.01); *G03B 17/38* (2013.01); *G03B 17/561* (2013.01);
(Continued)

(58) Field of Classification Search
CPC ............... H04N 5/2252; H04N 5/2251; H04N 5/23203; H04N 5/23206; H04N 5/23241;
(Continued)

(56) References Cited

U.S. PATENT DOCUMENTS 7,099,661 B1 * 8/2006 Longbottom ....... G06F 11/2023
370/250
2007/0021058 A1 * 1/2007 Arseneau .............. G06F 1/1626
455/3.06

(Continued)

FOREIGN PATENT DOCUMENTS

JP 2001-326845 A 11/2001
JP 2002-281468 A 9/2002
(Continued)

OTHER PUBLICATIONS

Japanese Office Action dated Nov. 8, 2016 for corresponding Japanese Application No. 2013-273519.
(Continued)

*Primary Examiner* — Christopher Braniff
(74) *Attorney, Agent, or Firm* — Michael Best & Friedrich LLP

(57) ABSTRACT

The embodiments describe an information processing device, which is connected to a plurality of imaging devices and a method for receiving images by the information processing device. The imaging devices have a first imaging device and a second imaging device. The method includes displaying a first image captured by the first imaging device and switching, at a time that the first image is not received by the information processing device, to a second image captured by the second imaging device.

18 Claims, 14 Drawing Sheets

(51) Int. Cl.
    *H04N 21/41* (2011.01)
    *H04N 7/18* (2006.01)
    *H04N 5/225* (2006.01)
    *G03B 17/56* (2006.01)
    *H01H 9/02* (2006.01)
    *H04N 5/232* (2006.01)
    *H04N 21/218* (2011.01)
    *H04N 21/488* (2011.01)
    *H04N 5/44* (2011.01)
    *G03B 17/20* (2006.01)
    *G03B 17/38* (2006.01)
    *G06F 3/0362* (2013.01)
    *H04M 1/725* (2006.01)

(52) U.S. Cl.
    CPC ........... *G03B 17/568* (2013.01); *G06F 1/163* (2013.01); *G06F 3/0362* (2013.01); *H01H 9/025* (2013.01); *H01H 9/0235* (2013.01); *H01H 9/0242* (2013.01); *H04N 5/2251* (2013.01); *H04N 5/23203* (2013.01); *H04N 5/23206* (2013.01); *H04N 5/23241* (2013.01); *H04N 5/23293* (2013.01); *H04N 5/44* (2013.01); *H04N 5/4403* (2013.01); *H04N 7/181* (2013.01); *H04N 21/21805* (2013.01); *H04N 21/4126* (2013.01); *H04N 21/4622* (2013.01); *H04N 21/4886* (2013.01); *H01H 2009/0257* (2013.01); *H04M 1/7253* (2013.01); *H04M 1/72533* (2013.01); *H04N 2005/4408* (2013.01)

(58) Field of Classification Search
    CPC .... H04N 5/23293; H04N 5/44; H04N 5/4403; H04N 7/181; H04N 21/21805; H04N 21/4126; H04N 21/4622; H04N 21/4886; H04N 2005/4408; G03B 17/20; G03B 17/38; G03B 17/561; G03B 17/568; G06F 1/163; G06F 3/0362; H01H 9/0242; H01H 9/025; H04M 1/7253; H04M 1/72533

See application file for complete search history.

(56) References Cited

U.S. PATENT DOCUMENTS

| | | | |
|---|---|---|---|
| 2010/0188473 A1* | 7/2010 | King | H04L 12/1818 348/14.02 |
| 2012/0013807 A1* | 1/2012 | Arora | H04N 5/268 348/705 |
| 2013/0194430 A1 | 8/2013 | Worrill | |

FOREIGN PATENT DOCUMENTS

| | | |
|---|---|---|
| JP | 2004-104369 A | 4/2004 |
| JP | 2004-356767 A | 12/2004 |
| JP | 2007-312113 A | 11/2007 |
| JP | 2009-503922 A | 1/2009 |
| JP | 2012-099889 A | 5/2012 |
| JP | 2012-119846 A | 6/2012 |

OTHER PUBLICATIONS

Chinese Office Action dated Oct. 8, 2018 for corresponding Chinese Application No. 201480069567.2.

* cited by examiner

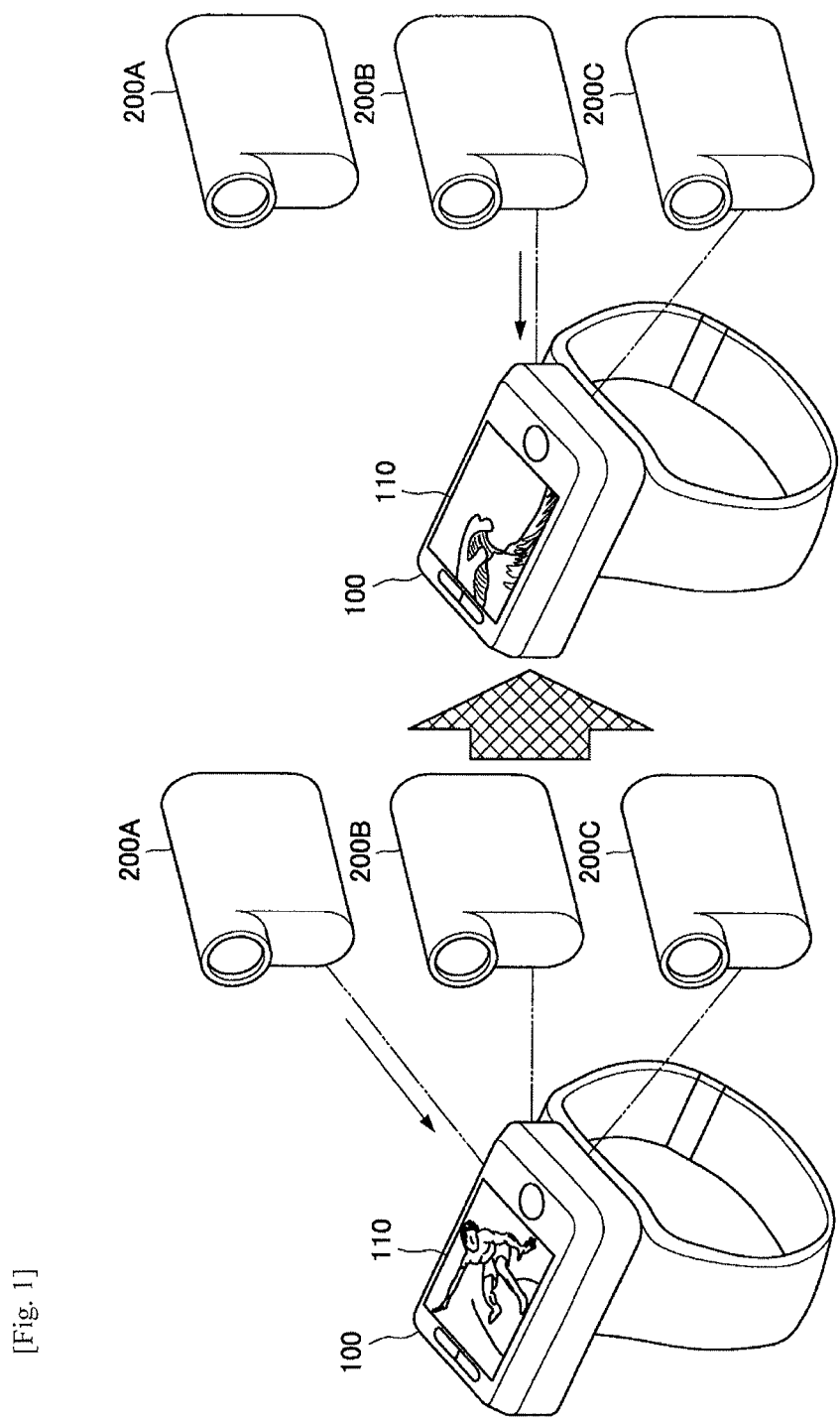
[Fig. 1]

[Fig. 2]
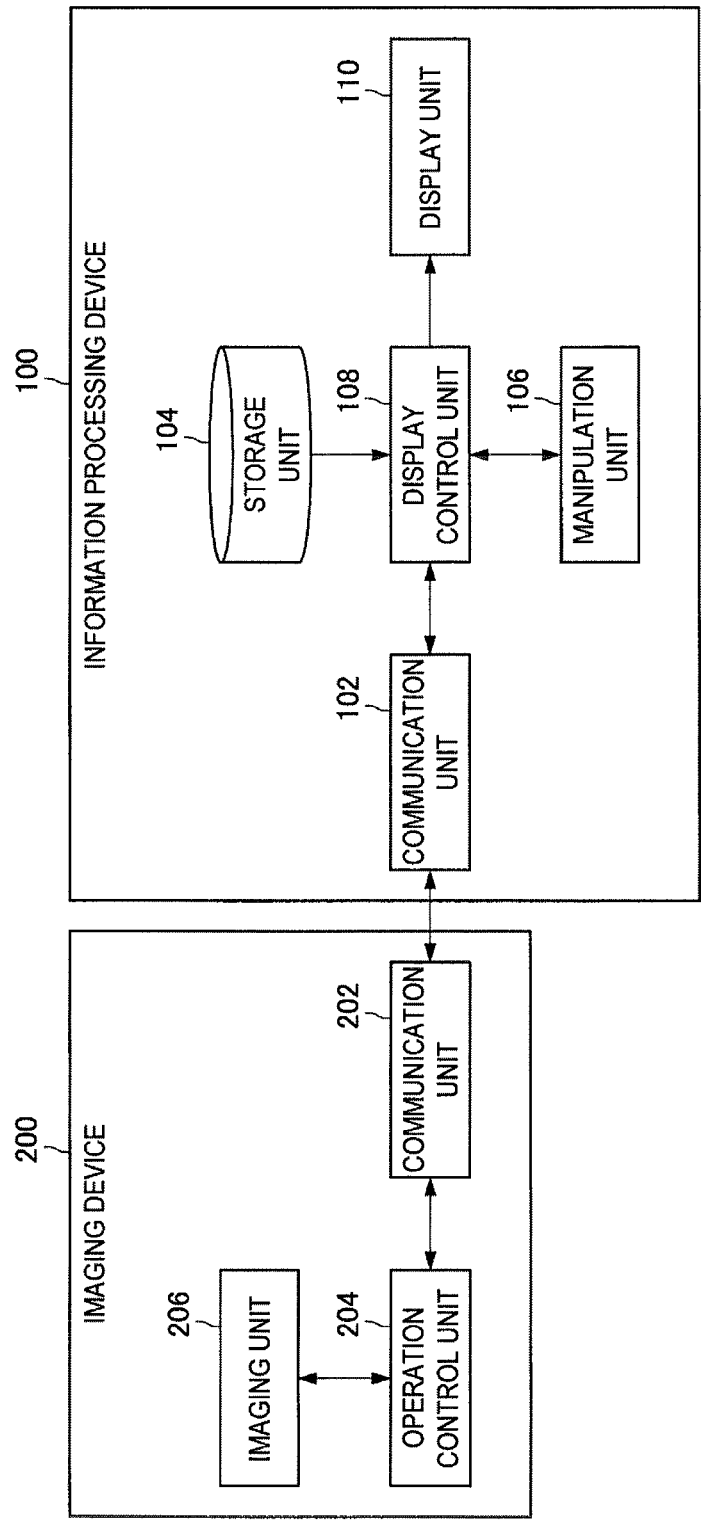

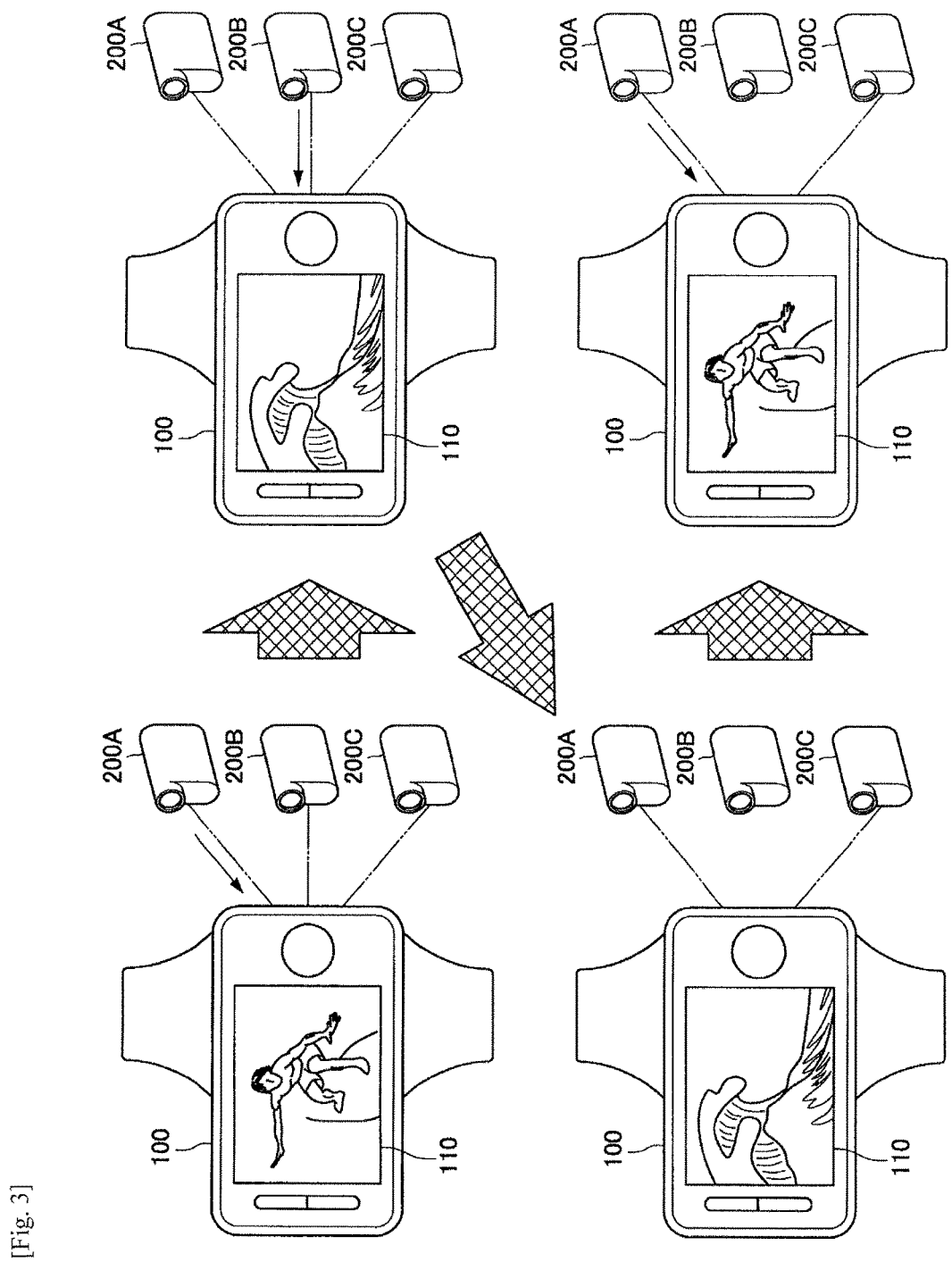
[Fig. 3]

[Fig. 4]
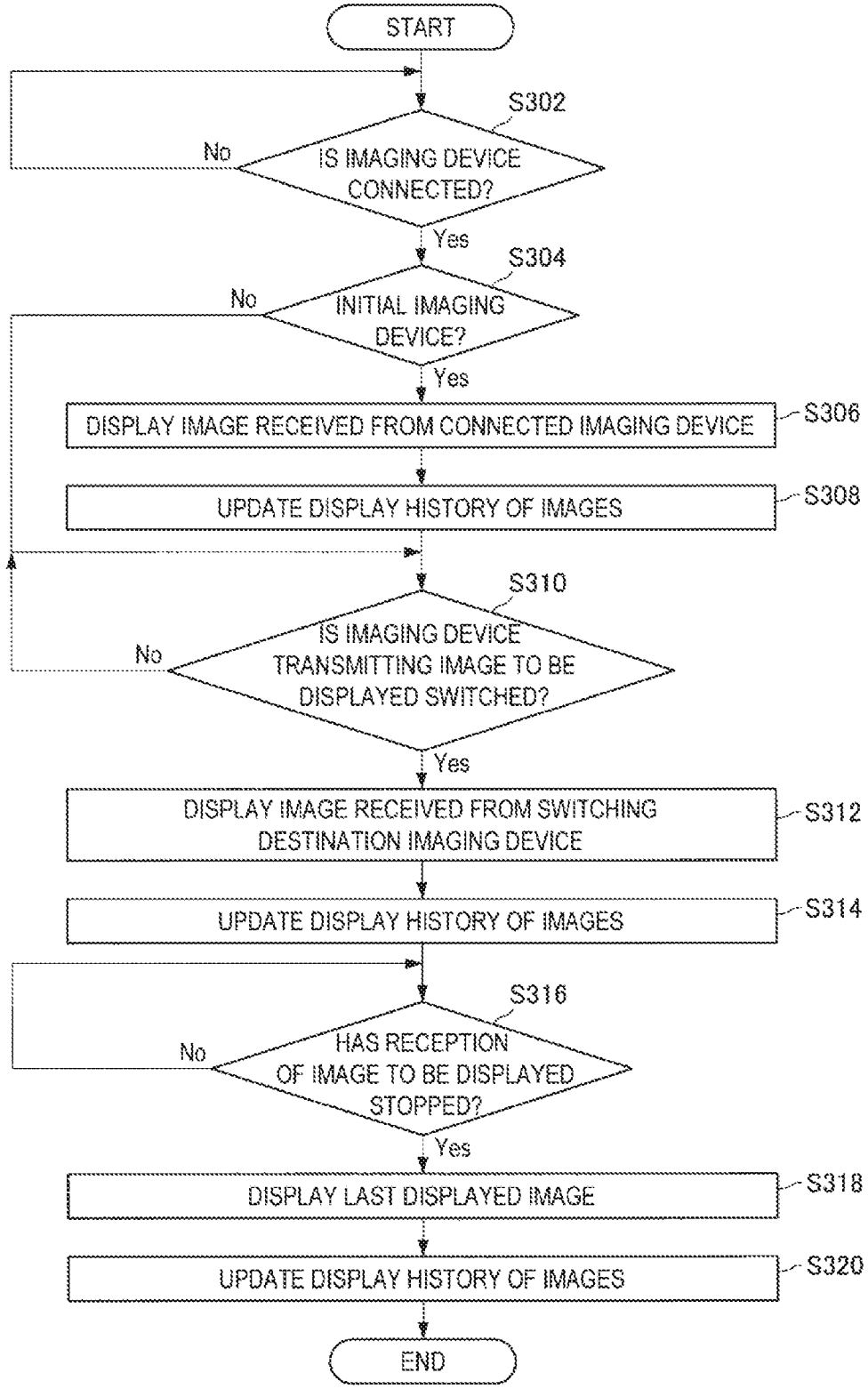

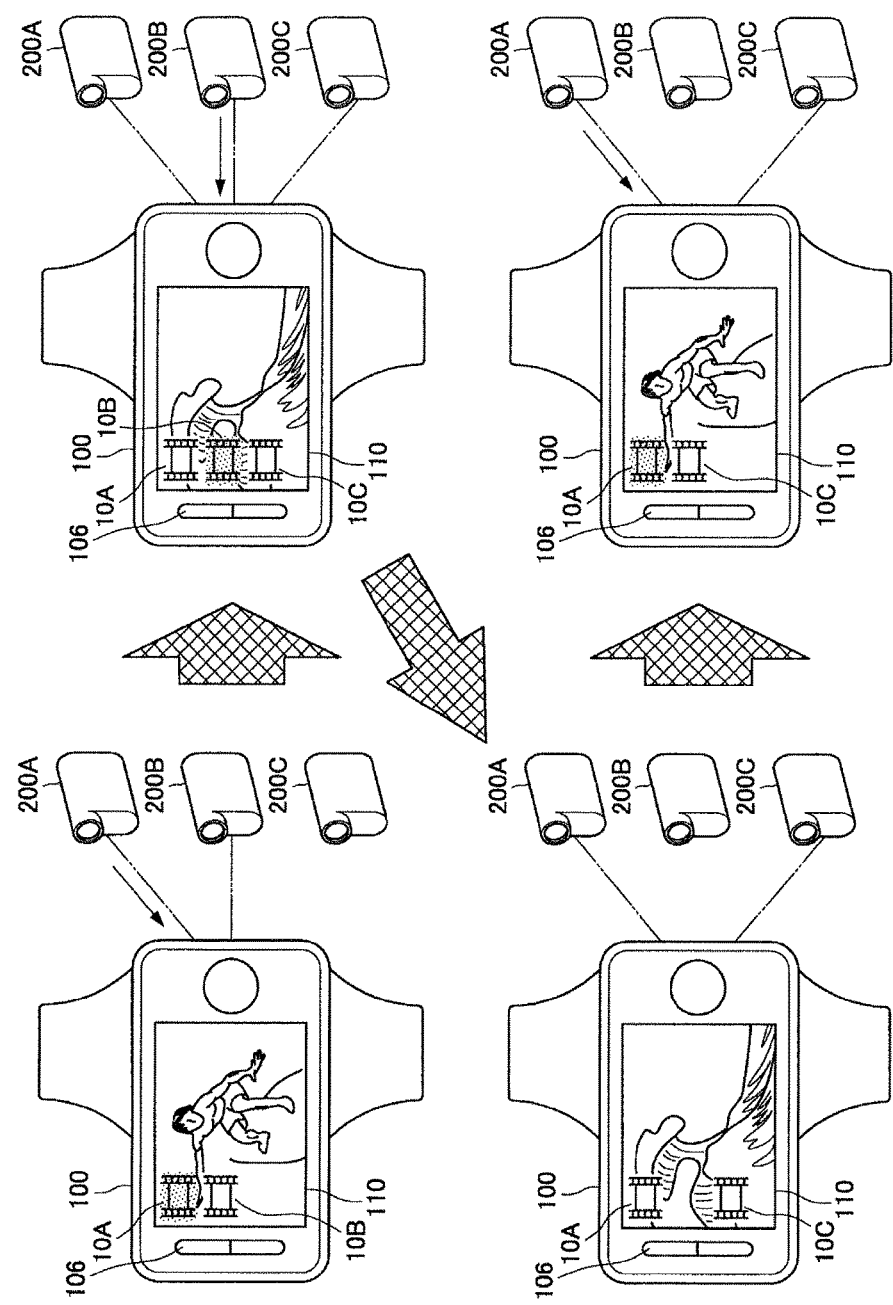

[Fig. 6]
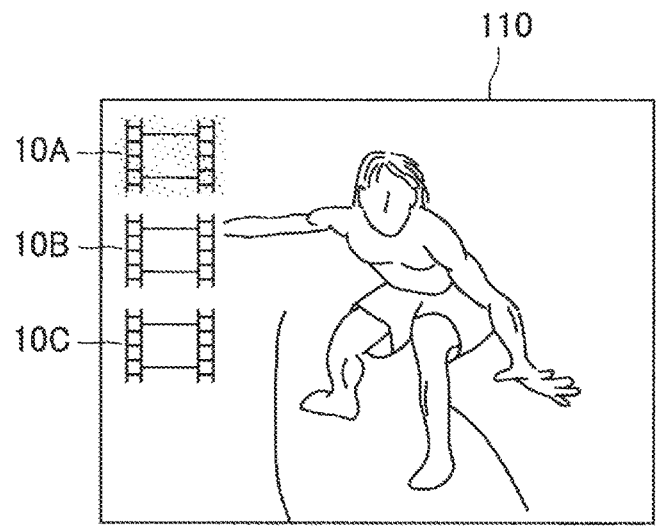
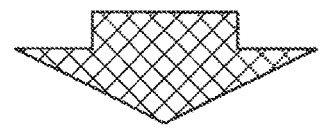
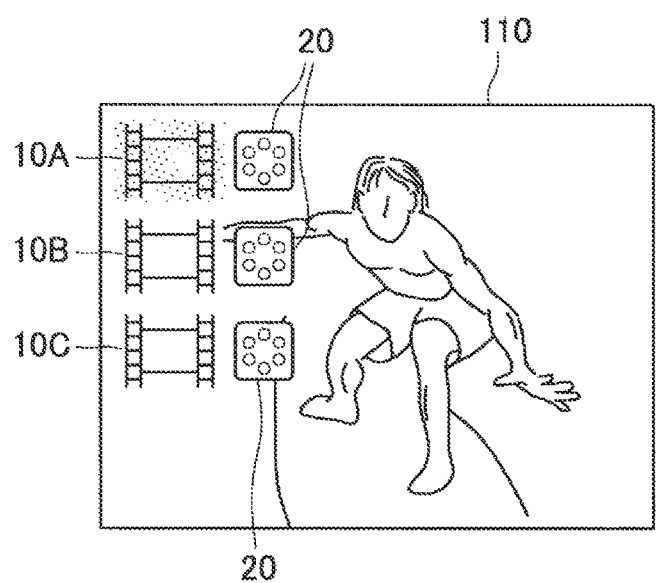

[Fig. 7A]
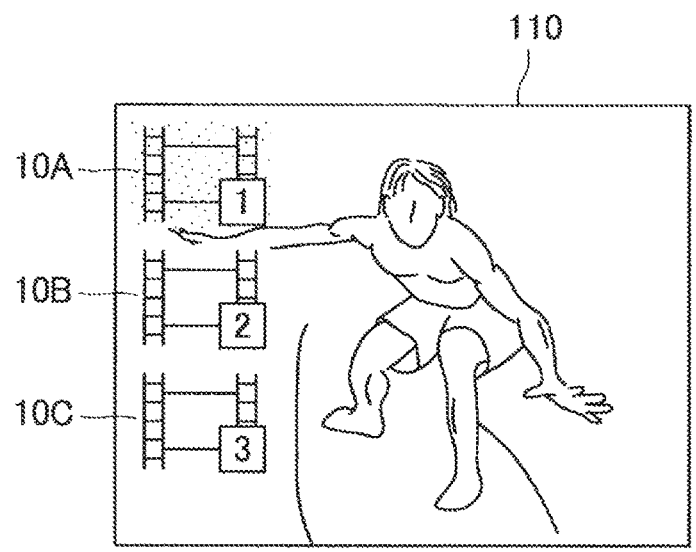
[Fig. 7B]
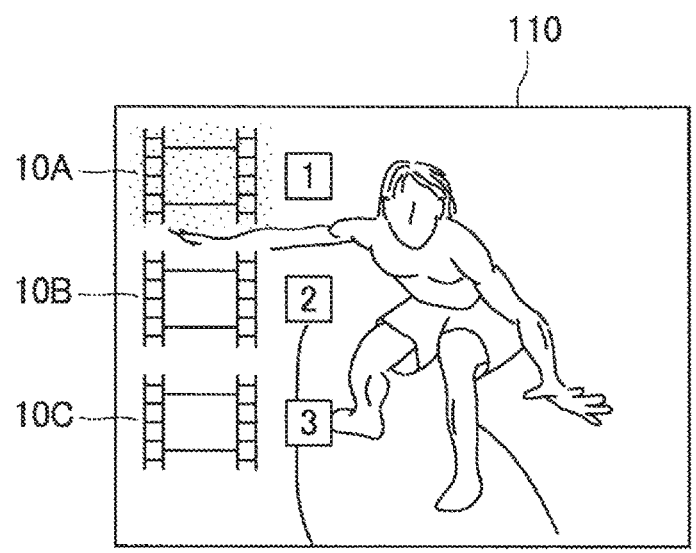

[Fig. 8]
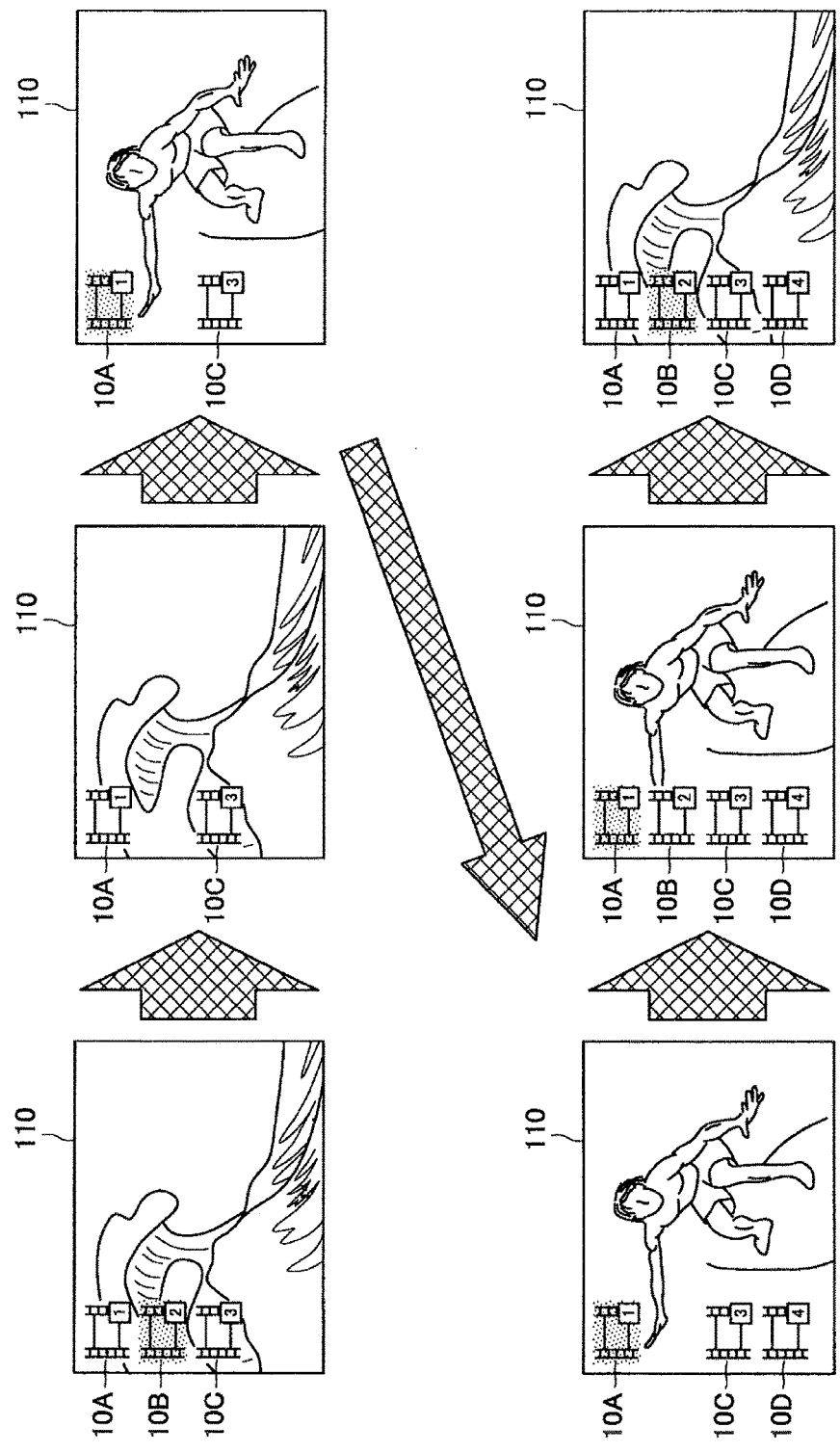

[Fig. 9A]
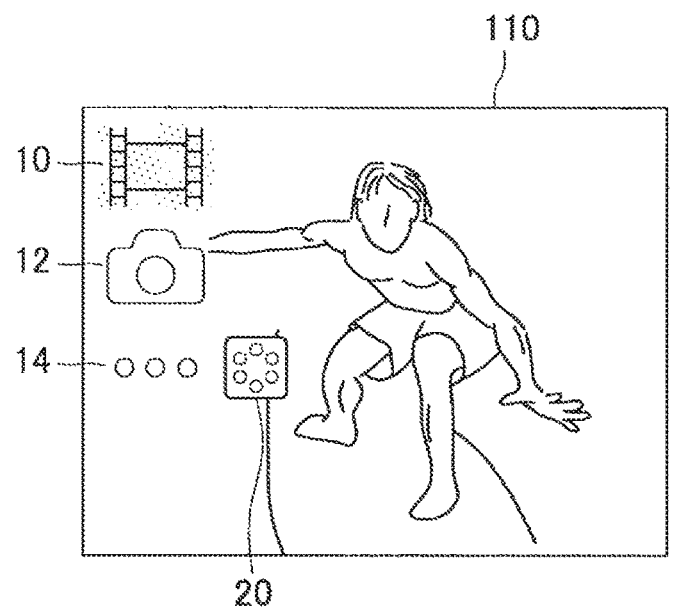
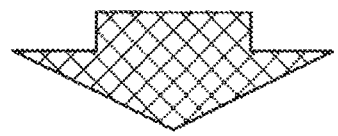
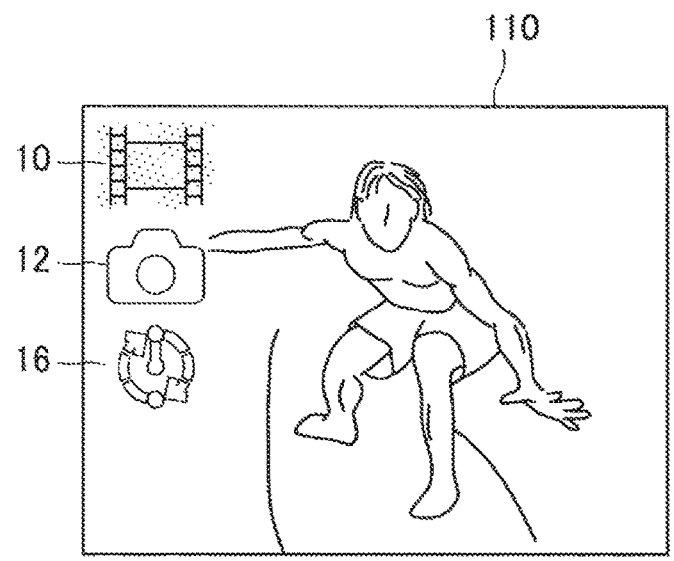

[Fig. 9B]
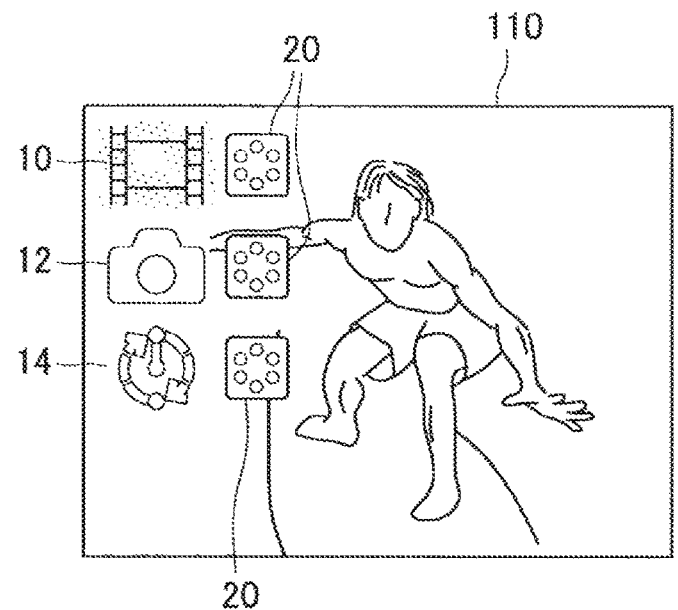
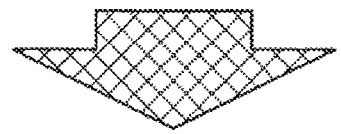
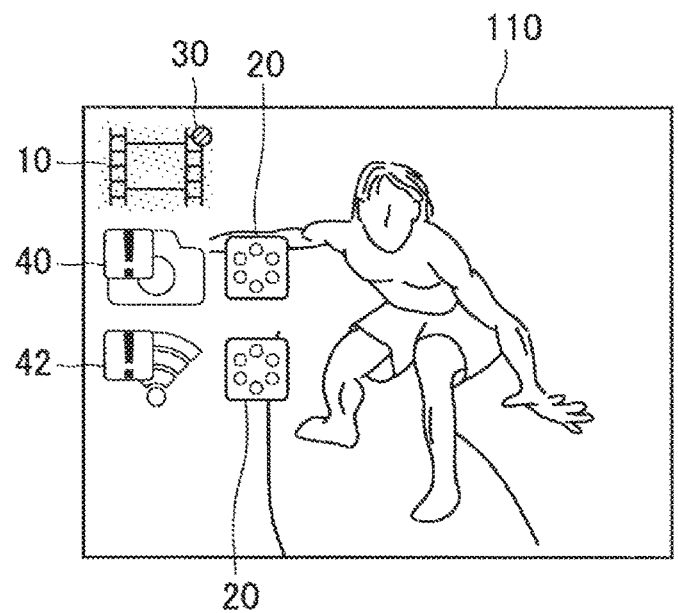

[Fig. 9C]
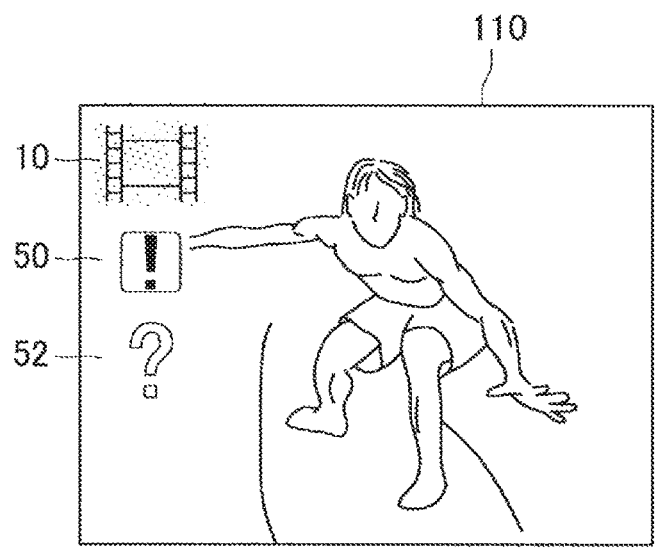

[Fig. 10]
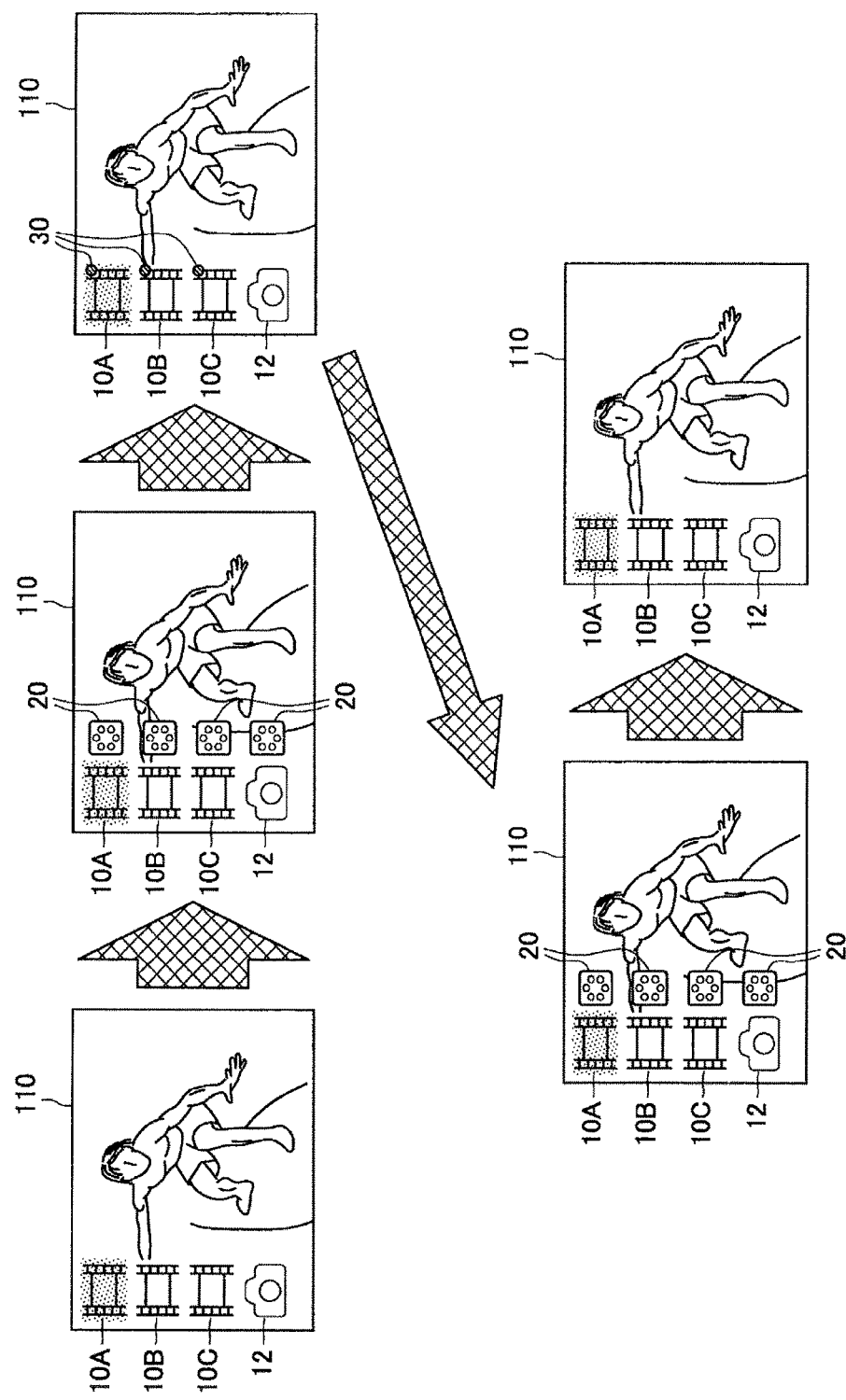

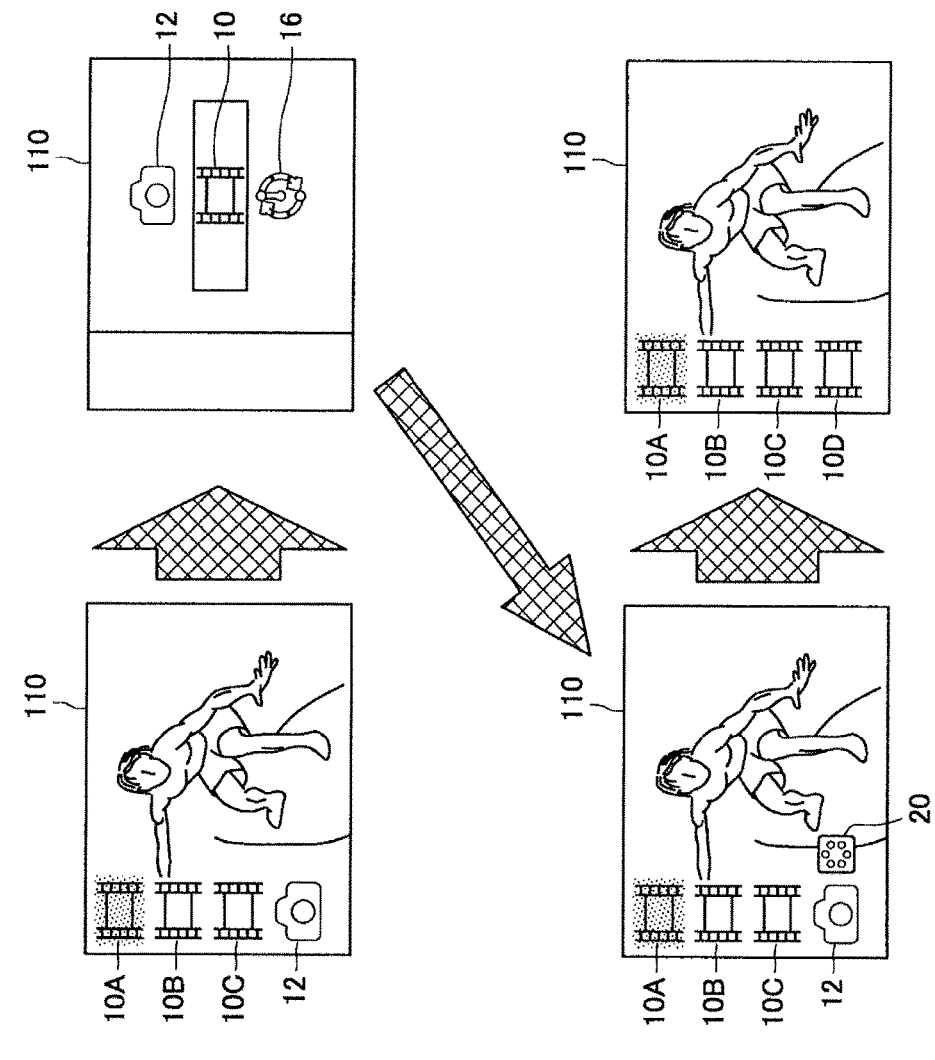
[Fig. 11]

[Fig. 12]
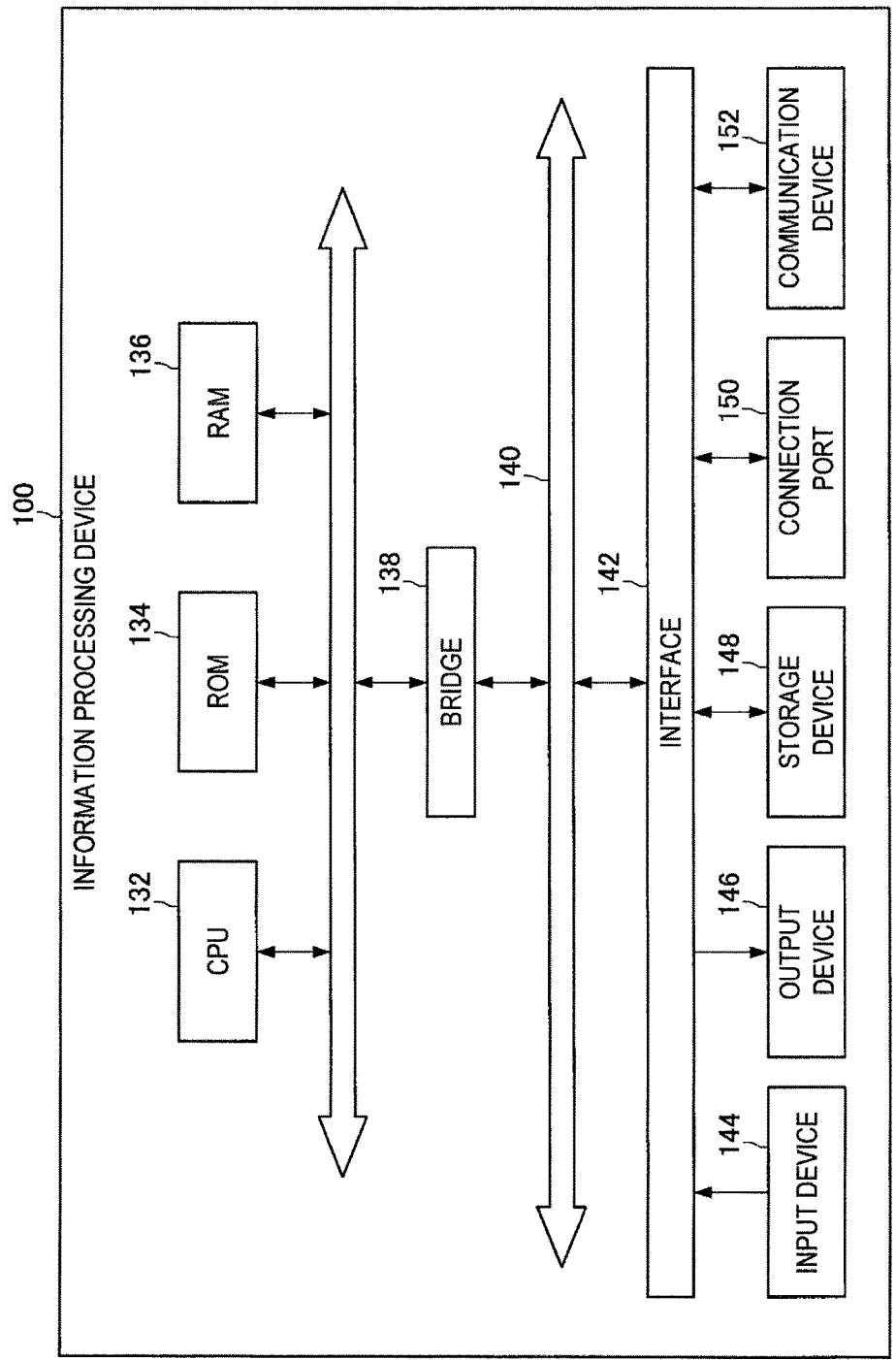

INFORMATION PROCESSING DEVICE, INFORMATION PROCESSING METHOD, AND PROGRAM

CROSS REFERENCE TO RELATED APPLICATIONS

This application claims the benefit of Japanese Priority Patent Application JP 2013-273519 filed Dec. 27, 2013, the entire contents of which are incorporated herein by reference.

TECHNICAL FIELD

The present disclosure relates to an information processing device, an information processing method, and a program.

BACKGROUND ART

In recent years, products in which communication technologies are applied to imaging devices such as digital cameras have generally been distributed. Operations of the imaging devices can be controlled through communication from external information processing devices or the like.

For example, PTL 1 discloses that the operations of a plurality of imaging devices are controlled using one remote controller and images obtained from the imaging devices are displayed on a display included in the remote controller.

Further, PTL 2 discloses that one monitor and a plurality of imaging devices are connected through communication and images obtained from the imaging devices are displayed on the monitor.

CITATION LIST

Patent Literature

[PTL 1]
JP 2001-326845A
[PTL 2]
JP 2012-119846A

SUMMARY

Technical Problem

In the disclosure of PTL 1 and PTL 2, however, a part or all of a screen may not be displayed when the communication connection between the remote controller and the imaging devices transmitting the images during the display on the monitor is disconnected. For this reason, a user performs, for example, a manipulation of switching the images to be displayed.

It is desirable to provide a novel and improved information processing device, a novel and improved information processing method, and a novel and improved program capable of switching images without a user performing a manipulation.

Solution to Problem

A method for receiving images by an information processing device that is connected to a plurality of imaging devices, the plurality of imaging devices including a first imaging device and a second imaging device, includes displaying a first image captured by the first imaging device and switching to a second image captured by the second imaging device, the switching occurring at a time that the first image is not received by the information processing device. The second imaging device is connected to the information processing device immediately before the first imaging device. Additionally, the second imaging device has a display time longer than one or more of the plurality of imaging devices where the display time includes a sum of display continuity time. Also, the second imaging device has a longer connection time to the information processing device than one or more of the plurality of imaging devices.

The information processing device displays a third image captured by the second imaging device immediately before the first image. The information processing device displays an object indicating that a communication process is being performed between one of the plurality of imaging devices and the information processing device. The information processing device further prompts a display of a plurality of icons respectively corresponding to the plurality of imaging devices. The second imaging device was chosen by selecting an icon among the plurality of icons that corresponds to the second imaging device. The information processing device may prompt the display of identification numbers respectively corresponding to the plurality of icons. One of the plurality of icons is removed from the display when a corresponding imaging device is disconnected from the information processing device. Then, the removed icon is reintroduced to the display when the corresponding imaging device is reconnected to the information processing device. Additionally, the display of plurality of icons changes according to mode information provided by the plurality of imaging devices. When a new imaging device is added to the plurality of imaging devices, a new icon is added to the display of the plurality of icons.

The information processing device is one of a smartphone, a tablet, a digital camera, a portable game device, and a personal digital assistant.

Advantageous Effects of Invention

According to an embodiment of the present disclosure described above, it is possible to provide an information processing device, an information processing method, and a program capable of switching images without a user performing a manipulation. The foregoing advantageous effects are not necessarily restrictive, but any advantageous effect desired to be obtained in the present specification or other advantageous effects understood from the present specification may be obtained along with the foregoing advantageous effects or instead of the foregoing advantageous effects.

BRIEF DESCRIPTION OF DRAWINGS

FIG. 1 is a diagram for describing an overview of an information processing device according to an embodiment of the present disclosure.

FIG. 2 is a block diagram illustrating overall functional configurations of the information processing device and an imaging device according to the embodiment of the present disclosure.

FIG. 3 is a diagram illustrating an example of switching of display of the information processing device according to the embodiment.

FIG. 4 is a flowchart conceptually illustrating a process of the information processing device according to the embodiment.

FIG. 5 is a diagram illustrating an example of a change in images and GUIs displayed in the information processing device according to a fourth modification example of the embodiment.

FIG. 6 is a diagram illustrating an example in which an object indicating that a communication process is being performed is displayed on a display unit of the information processing device according to a fifth modification example of the embodiment.

FIG. 7A is a diagram illustrating an example of display of identification numbers corresponding to the imaging devices displayed in the information processing device according to a sixth modification example of the embodiment.

FIG. 7B is a diagram illustrating another example of the display of the identification numbers corresponding to the imaging devices displayed in the information processing device according to the sixth modification example of the embodiment.

FIG. 8 is a diagram illustrating an example of a change in a display screen in a process relevant to redisplay of a deleted GUI of the information processing device according to a seventh modification example of the embodiment.

FIG. 9A is a diagram illustrating an example of a GUI indicating an operation state of the imaging device displayed in the information processing device according to an eighth modification example of the embodiment.

FIG. 9B is a diagram illustrating other example of GUIs indicating operation states of the imaging devices displayed in the information processing device according to the eighth modification example of the embodiment.

FIG. 9C is a diagram illustrating still other examples of GUIs and other GUIs indicating an operation state of the imaging device displayed in the information processing device according to the eighth modification example of the embodiment.

FIG. 10 is a diagram illustrating a change in a display screen relevant to an operation instruction to transition to a recording state of the information processing device according to a ninth modification example of the embodiment.

FIG. 11 is a diagram illustrating a change in a display screen relevant to a photographing-mode collective changing process of the information processing device according to a tenth modification example of the embodiment.

FIG. 12 is an explanatory diagram illustrating a hardware configuration of the information processing device according to an embodiment of the present disclosure.

DESCRIPTION OF EMBODIMENTS

Hereinafter, preferred embodiments of the present disclosure will be described in detail with reference to the appended drawings. Throughout the present specification and the drawings, the same reference numerals are given to constituent element having substantially the same configurations and repeated description will be omitted.

The description will be made in the following order.
1. Overview of information processing device according to embodiment of the present disclosure
2. Embodiment of the present disclosure
2-1. Configuration of information processing device according to embodiment
2-2. Process of information processing device according to embodiment
2-3. Modification examples of embodiment
3. Hardware configuration of information processing device according to embodiment of the present disclosure
4. Conclusion 1. OVERVIEW OF INFORMATION PROCESSING DEVICE ACCORDING TO EMBODIMENT OF THE PRESENT DISCLOSURE First, an overview of an information processing device according to an embodiment of the present disclosure will be described with reference to FIG. 1. FIG. 1 is a diagram for describing the overview of the information processing device according to the embodiment of the present disclosure.

An information processing device 100 illustrated in FIG. 1 is a handheld portable communication terminal which is carried by a user and performs communication connection with a plurality of imaging devices 200. The information processing device 100 includes a display unit 110 that displays an image. Therefore, the information processing device 100 can acquire an image from each of the plurality of imaging devices 200 through communication and display the acquired image on the display unit 110.

For example, as illustrated in the left drawing of FIG. 1, the information processing device 100 can perform the communication connection with the imaging devices 200A to 200C and display an image acquired from the imaging device 200A on the display unit 110. A two-dot chain line illustrated in FIG. 1 indicates that the information processing device 100 and the imaging device 200 are in a connection state and an arrow illustrated in FIG. 1 indicates data communication between the information processing device 100 and the imaging device 200.

Here, in general, since an image acquired through communication is not acquired when the communication connection with a device providing the image is cut off, a user waits for reconnection with the device or performs a connection manipulation with another device to acquire an image from the other device. Accordingly, when the information processing device 100 does not receive an image from the imaging device 200, the information processing device 100 automatically switches the image to be displayed to an image received from another imaging device 200.

For example, the imaging devices 200A to 200C can be mounted on a surfboard, the imaging device 200A can be installed on an anterior portion of the surfboard to face in an opposite direction to a movement direction of surfing and the imaging device 200B can be installed on an anterior portion of the surfboard to face in the movement direction of the surfing. Therefore, as illustrated in FIG. 1, the information processing device 100 displays an image received from the imaging device 200A, e.g., a person who is surfing, on the display unit 110.

When the connection with the imaging device 200A is cut off and the image is not received, the information processing device 100 automatically switches an image to be displayed to an image received from the imaging device 200B.

Thus, when the image is not received from the imaging device 200, the information processing device 100 according to the embodiment of the present disclosure automatically switches the image to be displayed to an image received from another imaging device 200. Therefore, by continuously receiving the images to be displayed, the image is displayed without interruption and it is thus possible to suppress occurrence of a waiting time and a manipulation of the user relevant to the image display. In FIG. 1, a remote controller with a display unit is illustrated as an example of the information processing device 100. However, the information processing device 100 may be a portable communication terminal such as a smartphone, a tablet, a digital camera, a portable game device, or a personal digital assistant (PDA).

2. EMBODIMENT OF THE PRESENT DISCLOSURE

2-1. Configuration of Information Processing Device According to Embodiment

The overview of the information processing device 100 according to the embodiment of the present disclosure has been described above. Next, the configuration of the information processing device 100 according to the embodiment of the present disclosure will be described with reference to FIG. 2. FIG. 2 is a block diagram illustrating overall functional configurations of the information processing device 100 and the imaging device 200 according to the embodiment of the present disclosure.

As illustrated in FIG. 2, the information processing device 100 includes a communication unit 102, a storage unit 104, a manipulation unit 106, a display control unit 108, and a display unit 110.

The communication unit 102 performs communication with the imaging device 200. Specifically, the communication unit 102 performs a request for transmitting an image obtained through imaging of the imaging device 200 and receives its image data. For example, the communication unit 102 can perform wireless communication using WiFi (registered trademark), Bluetooth (registered trademark), Zigbee (registered trademark), or the like.

The storage unit 104 stores a history of processes of the information processing device 100. Specifically, the storage unit 104 stores a display history or the like of images of the display control unit 108.

The manipulation unit 106 converts a user manipulation on the information processing device 100 into an input. Specifically, when a manipulation is performed by the user, the manipulation unit 106 generates input information according to the manipulation and supplies the generated input information to a processing function of the information processing device 100, e.g., the display control unit 108 or the like. For example, the manipulation unit 106 can be a button type or touch pad type input device.

The display control unit 108 performs display control on the display unit 110. Specifically, the display control unit 108 causes the display unit 110 to display an image received by the communication unit 102. When the image to be displayed by the display unit 110 is not received by the communication unit 102, the display control unit 108 switches the image to be displayed to an image received from a device specified from a history based on communication among the connected imaging devices 200. For example, the display control unit 108 causes the storage unit 104 to store a display history of images received from the imaging devices 200 as an example of the history based on the communication. Then, the display control unit 108 can switch the image to be displayed to an image received from the imaging device 200 specified based on the display history stored in the storage unit 104. Thus, the display history of the images is a display history of the images acquired based on the communication with the imaging devices 200. The display history can include, for example, a display starting time and a display ending time of an image.

The detailed operation of the display control unit 108 will be described with reference to FIG. 3. FIG. 3 is a diagram illustrating an example of the switch of the display of the information processing device 100 according to the embodiment.

First, the information processing device 100 acquires an image from the imaging device 200 through communication and causes the display unit 110 to display the acquired image. For example, the communication unit 102 performs communication connection with the imaging devices 200A to 200C and the display control unit 108 causes the communication unit 102 to transmit an image transmission request to the imaging device 200A. Then, as illustrated in the upper left drawing of FIG. 3, the information processing device 100 can display the display unit 110 to display an image received from the imaging device 200A. The display control unit 108 causes the storage unit 104 to store information indicating display of the image received from the imaging device 200A as the display history. In order to prevent display of an image temporarily displayed during selection of the imaging device 200 transmitting the image to be displayed from remaining as the display history, the display control unit 108 causes the storage unit 104 to store information indicating display of the image when the image is displayed for a predetermined time. In other words, the display control unit 108 does not store the intention to display the image as the display history when the image is displayed for a time shorter than the predetermined time. For example, the predetermined time can be set to be about 5 seconds to about 10 seconds.

Next, when the user performs a manipulation of switching the image to be displayed via the manipulation unit 106, the information processing device 100 switches the image to be displayed to a switching destination image. For example, when the user performs a manipulation of switching the display image to an image obtained through imaging of the imaging device 200B via the manipulation unit 106, the display control unit 108 causes the communication unit 102 to transmit an image transmission stopping request to the imaging device 200A and to transmit an image transmission request to the imaging device 200B. Then, as illustrated in the upper right drawing of FIG. 3, the display control unit 108 causes the display unit 110 to display the image received from the imaging device 200B. The display control unit 108 causes the storage unit 104 to store information indicating display of the image received from the imaging device 200B as the display history.

Next, when the communication connection with the imaging device 200 transmitting the image to be displayed is cut off, the information processing device 100 specifies the imaging device 200 transmitting the image to be displayed before the display of the image transmitted from the imaging device 200. For example, when the communication connection with the imaging device 200B is cut off, the display control unit 108 specifies the imaging device 200A transmitting the image displayed before the display of the image transmitted from the imaging device 200 with reference to the display history of a screen stored in the storage unit 104. The display control unit 108 can display the image received from the imaging device 200B until the image to be displayed is switched.

Next, the information processing device 100 switches the image to be displayed to the image received from the specified imaging device 200. For example, the display control unit 108 causes the communication unit 102 to transmit an image transmission request to the imaging device 200A specified from the display history of the screen and causes the display unit 110 to display the image received from the imaging device 200A.

Thus, the display control unit 108 switches the display to the image received from the imaging device 200 specified based on the display history of the received images. Therefore, it is possible to switch the display to an image according to the user's preference.

The display control unit 108 specifies the imaging device 200 transmitting the image displayed before the display of the image transmitted from the imaging device 200 with reference to the display history of the received images. Therefore, it is possible to switch the display to the image which is more likely to be preferred by the user to the image relevant to another imaging device 200.

Here, when the configuration of the information processing device 100 is described with reference back to FIG. 2, the display unit 110 displays an image according to a control instruction of the display control unit 108. For example, the display unit 110 can be a liquid crystal panel, an organic electro-luminescence (EL), or the like. As illustrated in FIG. 2, the imaging device 200 includes a communication unit 202, an operation control unit 204, and an imaging unit 206.

The communication unit 202 performs communication with the information processing device 100. Specifically, the communication unit 202 receives an image transmission request from the information processing device 100 and transmits an image obtained through imaging of the imaging unit 206 to the information processing device 100.

The operation control unit 204 controls an operation of the imaging device 200. Specifically, the operation control unit 204 gives an operation instruction or the like to the communication unit 202 and the imaging unit 206. For example, the operation control unit 204 causes the communication unit 202 to transmit an image obtained through the imaging of the imaging unit 206 to the information processing device 100 in response to the image transmission request received from the information processing device 100.

The imaging unit 206 performs imaging based on a control instruction by the operation control unit 204. For example, the imaging unit 206 can include an imaging optical system such as a zoom lens and a photographing lens condensing light and a signal conversion element such as a charge coupled device (CCD) or a complementary metal oxide semiconductor (CMOS).

2-2. Process of Information Processing Device According to Embodiment

Next, a process of the information processing device 100 according to the embodiment will be described with reference to FIG. 4. FIG. 4 is a flowchart conceptually illustrating the process of the information processing device 100 according to the embodiment.

First, the information processing device 100 waits until the imaging device 200 is connected (step S302).

When the imaging device 200 is connected in step S302, the information processing device 100 determines whether the initial imaging device 200 is connected (step S304). Specifically, when the communication connection with the imaging device 200 is established by the communication unit 102, the display control unit 108 determines whether the imaging device 200 other than the connected imaging device 200 is connected.

When the information processing device 100 determines in step S304 that the initial imaging device 200 is connected, the information processing device 100 displays the image received from the connected imaging device 200 (step S306). Specifically, the display control unit 108 causes the display unit 110 to display the image received by the communication unit 102.

Next, the information processing device 100 updates the display history of the images (step S308). Specifically, the display control unit 108 causes the storage unit 104 to store the history of the intention to display the image received from the imaging device 200.

Next, the information processing device 100 waits until the imaging device 200 transmitting the image to be displayed is switched (step S310).

When the imaging device 200 transmitting the image to be displayed is switched in step S310, the information processing device 100 displays the image received from the switching destination imaging device 200 (step S312). Specifically, when a manipulation of switching the imaging device 200 transmitting the image to be displayed is performed via the manipulation unit 106, the display control unit 108 transmits the image transmission stopping request to the imaging device 200 transmitting the displayed image and transmits the image transmission request to the switching destination imaging device 200. Then, the display control unit 108 causes the display unit 110 to display the image received from the switching destination imaging device 200.

Next, as in step S308, the information processing device 100 updates the display history of the images (step S314).

Next, the information processing device 100 waits until the image to be displayed is not received (step S316).

When the image to be displayed is not received in step S316, the information processing device 100 displays the last displayed image (step S318). Specifically, when the image to be displayed is not received from the imaging device 200 by the communication unit 102, the display control unit 108 causes the communication unit 102 to transmit the image transmission request to the imaging device 200 transmitting the image displayed immediately before the image received from the imaging device 200 with reference to the display history stored in the storage unit 104. Then, the display control unit 108 causes the display unit 110 to display the image received from the imaging device 200 to which the image transmission request is transmitted.

Next, as in steps S308 and S314, the information processing device 100 updates the display history of the images (step S320).

Thus, according to the embodiment of the present disclosure, the information processing device 100 switches the image to be displayed to the image received from the device specified from the history based on the communication among the connected imaging devices 200, when the image to be displayed by the display unit 110 is not received by the communication unit 102. Therefore, by automatically switching the imaging device 200 transmitting the image to be displayed, it is possible to prevent the display of the image from being stopped.

2-3. Modification Examples of Embodiment

The embodiment of the present disclosure has been described above. Embodiments of the present disclosure are not limited to the above-described examples. Hereinafter, first to eighth modification examples of the embodiment will be described.

First Modification Example

As a first modification example of the embodiment, when the image to be displayed is not received, the display control unit 108 may specify the imaging device 200 transmitting the image having a longer display time than other images do as the switching destination imaging device 200 with reference to the display history. Specifically, when the image to be displayed on the display unit 110 is not received by the communication unit 102, the display control unit 108 specifies the imaging device 200 transmitting the image having a longer display time than other images do with reference to the display starting time and the display ending time of the display history stored in the storage unit 104. Then, the display control unit 108 causes the communication unit 102 to transmit an image transmission request to the specified imaging device 200 and causes the display unit 110 to display an image received from the imaging device 200. The display time can be a sum of display continuity times.

Thus, according to the first modification example of the embodiment, the display control unit 108 specifies the imaging device 200 transmitting the image having a display time longer than other images do as the switching destination imaging device 200 when the image to be displayed is not received. Therefore, by switching the image to an image which is more likely to be desired to be viewed by the user than the other images, it is possible to improve convenience for the user.

Second Modification Example

As a second modification example of the embodiment, when the image to be displayed is not received, the display control unit 108 may specify the switching destination imaging device 200 based on a communication connection history which is an example of the history based on the communication. Specifically, when the image to be displayed by the display unit 110 is not received by the communication unit 102, the display control unit 108 specifies the imaging device 200 having a longer connection time than the other devices do as the switching destination imaging device 200 with reference to the communication connection history. For example, the communication unit 102 can cause the storage unit 104 to store a connection starting time and a connection ending time of the imaging device 200 establishing communication connection as the communication connection history. When the image to be displayed by the display unit 110 is not received by the communication unit 102, the display control unit 108 specifies the imaging device having a longer connection time than the other imaging devices 200 do among the connected imaging devices 200 with reference to the communication connection history stored in the storage unit 104. When, the display control unit 108 causes the communication unit 102 to transmit an image transmission request to the specified imaging device 200 and causes the display unit 110 to display the image received from the imaging device 200. The connection time can be a continuity time of the communication connection.

Thus, according to the second modification example of the embodiment, the display control unit 108 specifies the switching destination imaging device 200 based on the communication connection history when the image to be displayed is not received. Therefore, by automatically switching the imaging device to another imaging device 200 of which stability of the communication connection is higher than the other imaging devices 200, it is possible to improve convenience for the user.

When the image to be displayed by the display unit 110 is not received by the communication unit 102, the display control unit 108 specifies the imaging device 200 having a longer connection time than the other devices do as the switching destination imaging device 200. Therefore, by switching the imaging device to the imaging device 200 having a longer and stable communication connection than the other imaging devices 200 do, it is possible to prevent the display image from being frequently switched due to the communication connection being cut off.

Third Modification Example

As a third modification of the embodiment, when the image to be displayed is not received, the display control unit 108 may specify the imaging device 200 having higher radio wave intensity than the other devices do as the switching destination imaging device 200 with reference to the communication connection history. Specifically, the communication unit 102 causes the storage unit 104 to store the radio wave intensities of the connected imaging devices 200 at a predetermined time as the communication connection history. When the image to be displayed by the display unit 110 is not received by the communication unit 102, the display control unit 108 specifies the imaging device 200 having higher radio wave intensity than the other imaging devices 200 do for a period dated back by a predetermined time from the present time among the connected imaging devices 200 with reference to the history of the radio wave intensities stored in the storage unit 104. For example, the display control unit 108 can specify the imaging device 200 of which an average value of the radio wave intensities up to the period dated back by the predetermined time from the present time is higher than the other imaging devices 200. Then, the display control unit 108 causes the communication unit 102 to transmit an image transmission request to the specified imaging device 200 and causes the display unit 110 to display an image received from the imaging device 200. In the foregoing example, the example in which the display control unit 108 specifies the imaging device 200 of which the average value of the radio wave intensities up to the period dated back by the predetermined time from the present time is higher than the other imaging devices 200 has been described. However, the display control unit 108 may specify the imaging device 200 of which the radio wave intensity in a period dated back by a predetermined time from the present time is higher than the other imaging devices 200.

Thus, according to the third modification example of the embodiment, the display control unit 108 specifies the imaging device 200 having higher radio wave intensity than the other imaging devices 200 do as the switching destination imaging device 200 when the image to be displayed is not received. Therefore, by switching the imaging device to the more stable imaging device 200 having higher radio wave intensity than the other imaging devices 200 do, it is possible to prevent the display image from being frequently switched due to the communication connection being cut off.

Fourth Modification Example

As a fourth modification example of the embodiment, the display control unit 108 may display a GUI corresponding to the imaging device 200 and selected via the manipulation unit 106 and switch the image to be displayed to an image transmitted by the imaging device 200 corresponding to the selected GUI. The GUI is also referred to as an "icon," an "image," an "object," "display indicating the imaging device 200," or "display indicating the state of the imaging device 200." Specifically, the foregoing process of the display control unit 108 will be described with reference to FIG. 5. FIG. 5 is a diagram illustrating an example of a change in an image and a GUI displayed in the information processing device 100 according to the fourth modification example of the embodiment.

First, the display control unit 108 causes the display unit 110 to display a received image and a GUI corresponding to each of the connected imaging devices 200. For example, as illustrated in the upper left drawing of FIG. 5, the display control unit 108 can display a GUI 10A and a GUI 10B corresponding to the connected imaging devices 200A and 200B such that the GUI 10A and the GUI 10B are arranged vertically in a line and superimposed on the image received from the imaging device 200A. The GUIs corresponding to the imaging devices 200 are displayed at positions adjacent to the manipulation unit 106 on a display screen of the display unit 110. Therefore, it is easy for a user to intuitively understand that the screen display is changed through his or her manipulation. The example in which the GUIs are displayed in a line has been described above, but the GUIs may be displayed in a plurality of lines.

When the information processing device 100 is rotated with respect to the direction illustrated in FIG. 5 to be used, the display control unit 108 may rotate the screen displayed by the display unit 110. Specifically, when the rotation of the information processing device 100 is detected by a sensor separately included in the information processing device 100, the display control unit 108 rotates the display screen by a detected rotation angle. For example, when it is detected by an angular velocity sensor or the like that the information processing device 100 is rotated 180 degrees, the display control unit 108 can rotate the display screen 180 degrees in an opposite direction to the detected rotation direction. Therefore, by displaying the screen according to a use state of the information processing device 100 used by the user, it is possible to improve convenience for the user. The display control unit 108 can update the display so that the display screen is rotated and the GUIs are displayed at positions adjacent to the manipulation unit 106.

The display control unit 108 displays the GUI so that the imaging device 200 transmitting the image to be displayed is indicated. For example, as illustrated in the upper left drawing of FIG. 5, the display control unit 108 can display the image received from the imaging device 200A and opaquely display a background of a display area of the GUI corresponding to the imaging device 200A. Therefore, the user can see which imaging device 200 is transmitting the image to be displayed. Further, by opaquely displaying the background of the display area of the GUI, the user can visually comprehend the imaging device 200 transmitting the image to be displayed.

The example in which the display control unit 108 opaquely displays the backgroUnd of the GUI corresponding to the imaging device 200 transmitting the image to be displayed has been described above. However, the display control unit 108 may display the background of the display area of the GUI corresponding to the imaging device 200 transmitting the image to be displayed so that the background is different from backgrounds of the display areas of the other GUIs. For example, the display control unit 108 can display the color or shape of the background of the display area of the GUI corresponding to the imaging device 200 transmitting the image to be displayed so that the color or shape is different from the color or shape of the background of the display area of another GUI. Therefore, by emphasizing a visual difference between the GUI corresponding to the imaging device 200 transmitting the image to be displayed and another GUI, the user can more easily see which imaging device 200 is transmitting the image to be displayed.

The display control unit 108 may display an object indicating the imaging device 200 transmitting the image to be displayed near the GUI corresponding to the imaging device 200. For example, the display control unit 108 can display an arrow or triangular object indicating the GUI at a position adjacent to the GUI corresponding to the imaging device 200 transmitting the image to be displayed. In this case, by additionally displaying an object apart from the GUI, the user can more easily see which GUI is in the selection state.

Next, when the imaging device 200 is additionally connected, the display control unit 108 displays a GUI corresponding to the additionally connected imaging device 200 so that this GUI is added to arrangement of the GUI which is being displayed. For example, as illustrated in the upper right drawing of FIG. 5, when the imaging device 200C is additionally connected, the display control unit 108 displays a GUI 10C corresponding to the imaging device 200C below the GUI 10B. Thus, the display control unit 108 arranges and displays the GUIs in an order in which the imaging devices 200 are connected. Therefore, it is easy for the user to see to which imaging devices 200 the GUIs correspond.

Next, when the user performs a manipulation of changing a selected GUI (hereinafter also referred to as a GUI in a selection state) via the manipulation unit 106, the display control unit 108 causes the display unit 110 to display an image received from the imaging device 200 corresponding to the changed GUI in the selection state. For example, when the user performs a manipulation of changing the GUI in the selection state from the GUI 10A to the GUI 10B via the manipulation unit 106, the display control unit 108 causes the communication unit 102 to transmit an image transmission stopping request to the imaging device 200A and to transmit an image transmission request to the imaging device 200B. Then, as illustrated in the upper right drawing of FIG. 5, the display control unit 108 switches the image to be displayed to an image received from the imaging device 200B. The display control unit 108 causes the background of the display area of the GUI 10B in the selection state to be opaque.

Next, when the image to be displayed is not received from the imaging device 200, the display control unit 108 deletes the GUI corresponding to the imaging device 200. For example, as illustrated in the lower left drawing of FIG. 5, when the communication connection with the imaging device 200B is cut off and the image to be displayed is not received by the communication unit 102, the display control unit 108 deletes the GUI corresponding to the imaging device 200B from the display screen. In the lower left drawing of FIG. 5, the example in which the display control unit 108 displays the image finally received from the imaging device 200B is illustrated. However, when the image is not received from the imaging device 200B, the display control unit 108 may stop displaying the image. For example, when the image to be displayed is not received, the display control unit 108 can stop displaying the image and darken the screen until an image to be subsequently displayed is received. In this case, it is easy for the user to understand that the image to be displayed is not received.

Next, the display control unit 108 specifies the imaging device 200 transmitting the image to be displayed with reference to the display history or the like and causes the display unit 110 to display the image received from the specified imaging device 200. The display control unit 108 opaquely displays the background of the display area of the GUI corresponding to the specified imaging device 200. When a gap occurs in the arrangement of the GUIs due to the deletion of the GUI, the display control unit 108 displays the GUI displayed subsequently to the deleted GUI at an area corresponding to the display position before the deletion of the deleted GUI. For example, the display control unit 108 can specify the imaging device 200A transmitting the image displayed immediately before the image received from the imaging device 200B with reference to the display history and cause the communication unit 102 to transmit an image transmission request to the imaging device 200A. Then, as illustrated in the lower right drawing of FIG. 5, the display control unit 108 can cause the display unit 110 to display the image received from the imaging device 200A. As illustrated in the lower right drawing of FIG. 5, the display control unit 108 can opaquely display the background of the display area of the GUI corresponding to the imaging device 200A. As illustrated in the lower right drawing of FIG. 5, the display control unit 108 can move the GUI 10C corresponding to the imaging device 200 to the area in which the GUI 10B corresponding to the imaging device 200B has been displayed. When the GUI is deleted, the display control unit 108 may move the GUI 10C to the area in which the GUI 10B has been displayed.

Thus, according to the fourth modification example of the embodiment, the display control unit 108 displays the GUI corresponding to the imaging device 200 selected via the manipulation unit 106 and switches the image to be displayed to an image transmitted by the imaging device 200 corresponding to the GUI in the selection state. Therefore, the user can perform the manipulation of selecting the imaging device 200 relevant to the image to be displayed while visually confirming the manipulation.

Fifth Modification Example

As a fifth modification example of the embodiment, the display control unit 108 may display an object indicating that a communication process is being performed near the GUI corresponding to the imaging device 200 which is performing the communication process. Specifically, the display control unit 108 displays the object indicating that the communication process is being performed at a turn-around time in the communication performed with the imaging device 200 by the communication unit 102 near the GUI corresponding to the imaging device 200. For example, display of an object indicating that a communication process is being performed will be described with reference to FIG. 6. FIG. 6 is a diagram illustrating an example in which an object indicating that a communication process is being performed is displayed by the display unit 110 of the information processing device 100 according to the fifth modification example of the embodiment.

First, the display control unit 108 causes the display unit 110 to display the GUI corresponding to each of the connected imaging devices 200. For example, as illustrated in the upper drawing of FIG. 6, the display control unit 108 can cause the display unit 110 to display the GUI 10A to the GUI 10C.

Next, when the communication process with the imaging devices 200 corresponding to the displayed GUIs starts, the display control unit 108 displays objects indicating that the communication process is being performed at positions adjacent to the GUIs. For example, when the communication process with the imaging devices 200 corresponding to the displayed GUI 10A to GUI 10C starts, the display control unit 108 displays objects 20 on the right side of the GUI 10A to the GUI 10C, as illustrated in the lower drawing of FIG. 6. When the communication process ends, the display control unit 108 deletes the displayed objects from the display screen. In the foregoing example, the example in which the display control unit 108 displays the objects indicating that the communication process is being performed on the right side of the GUIs has been described. However, the display control unit 108 may display the objects at positions closer to the center of the screen than the GUIs or positions more distant from the manipulation unit 106 than the GUIs.

Thus, according to the fifth modification example of the embodiment, the display control unit 108 displays the objects indicating that the communication process being performed near the GUIs corresponding to the imaging devices 200 which are performing the communication process. Therefore, by allowing the user to recognize that the information processing device 100 is operating, it is possible to reduce a user's feeling of uneasiness in the process of the information processing device 100.

Sixth Modification Example

As a sixth modification example of the embodiment, the display control unit 108 may display the imaging devices 200 corresponding to GUIs so that the imaging devices 200 are identifiable. Specifically, the display control unit 108 causes the display unit 110 to display GUIs and identification numbers corresponding to the imaging devices 200. For example, the identification numbers corresponding to the imaging devices 200 will be described with reference to FIGS. 7A and 7B. FIG. 7A is a diagram illustrating an example of display of the identification numbers corresponding to the imaging devices 200 displayed in the information processing device 100 according to the sixth modification example of the embodiment. FIG. 7B is a diagram illustrating another example of the display of the identification numbers corresponding to the imaging devices 200 displayed in the information processing device 100 according to the sixth modification example of the embodiment.

For example, the display control unit 108 may display a number used to identify each of the imaging devices 200 so that the number is superimposed on the GUI corresponding to each of the imaging devices 200. Specifically, as illustrated in FIG. 7A, the display control unit 108 can display the GUI 10A to the GUI 10C corresponding to the connected imaging devices 200. The display control unit 108 can allocate identification number 1 to the imaging device 200 corresponding to the GUI 10A, identification number 2 to the imaging device 200 corresponding to the GUI 10B, and identification number 3 to the imaging device 200 corresponding to the GUI 10C and can display identification numbers 1 to 3 so that the corresponding identification numbers 1 to 3 are superimposed on the GUI 10A to the GUI 10C, as illustrated in FIG. 7A.

The display control unit 108 may display a number used to identify each of the imaging devices 200 at a position adjacent to the GUI corresponding to each of the imaging devices 200. Specifically, as illustrated in FIG. 7B, the display control unit 108 can display the GUI 10A to the GUI 10C corresponding to the connected imaging devices 200. The display control unit 108 can allocate identification numbers 1 to 3 to the imaging devices 200 corresponding to the GUI 10A to the GUI 10C, as in the example illustrated in FIG. 7A, and can display the corresponding identification numbers 1 to 3 at positions adjacent to the GUI 10A to the GUI 10C, as illustrated in FIG. 7B. In FIGS. 7A and 7B, the examples in which the identification numbers are displayed have been described. However, identifiable images, shapes, or colors may be displayed.

Thus, according to the sixth modification example of the embodiment, the display control unit 108 displays the identification numbers corresponding to the imaging devices 200 corresponding to the GUIs. Therefore, the user can identify each of the imaging devices 200 and can easily perform a manipulation of selecting the imaging device 200.

Seventh Modification Example

As a seventh modification example of the embodiment, the display control unit 108 may delete the GUI corresponding to the disconnected imaging device 200. When the imaging device 200 is reconnected, the display control unit 108 may redisplay the GUI corresponding to the imaging device 200 in an area corresponding to the area before the deletion of the GUI corresponding to the imaging device 200. Specifically, when the display control unit 108 deletes the GUI corresponding to the disconnected imaging device 200, the display control unit 108 may not display the GUI relevant to another imaging device 200 in the area corresponding to the display position before the deletion of the deleted GUI. When the disconnected imaging device 200 is reconnected, the display control unit 108 may display the GUI relevant to the reconnected imaging device 200 in the area. For example, a process relevant to the redisplay of the deleted GUI will be described with reference to FIG. 8. FIG. 8 is a diagram illustrating an example of a change in a display screen in the process relevant to the redisplay of the deleted GUI of the information processing device 100 according to the seventh modification example of the embodiment.

First, the display control unit 108 causes the display unit 110 to display the GUI corresponding to each of the connected imaging devices 200. For example, as illustrated in the upper left drawing of FIG. 8, the display control unit 108 can cause the display unit 110 to display an image received from the imaging device 200 corresponding to the GUI 10B and to display the GUI 10A to the GUI 10C to be superimposed on the image. The display control unit 108 can display the GUI 10B corresponding to the imaging device 200 transmitting the image being displayed as a GUI in the selection state. The display control unit 108 can display the identification numbers the GUI 10A to the GUI 10C, the identification numbers indicating a connection order.

Next, when the communication with the imaging device 200 transmitting the image to be displayed is cut off, the display control unit 108 deletes the GUI corresponding to the imaging device 200 from the display screen. Further, the display control unit 108 does not display the GUI in the area corresponding to the display position of the deleted GUI. For example, when the communication with the imaging device 200 corresponding to the GUI 10B and transmitting the image to be displayed is cut off, the display control unit 108 deletes the GUI 10B, as illustrated in the upper middle drawing of FIG. 8. Further, the display control unit 108 does not display the GUI in the display area in which the deleted GUI 10B was displayed before the deletion. For example, the display control unit 108 moves the GUI 10C in a direction oriented to the GUI 10A and does not perform control so that a space of the display of the GUIs is filled. The display control unit 108 may display a GUI indicating that the communication connection is cut off and the GUI corresponding to the imaging device 200 is deleted in the display area in which the deleted GUI was displayed before the deletion. For example, the GUI indicating that the communication connection is cut off and the GUI corresponding to the imaging device 200 is deleted can be a circle or the like.

Next, the display control unit 108 specifies the imaging device 200 transmitting the image to be displayed with reference to the display history or the like and causes the display unit 110 to display the image received from the specified imaging device 200. For example, the display control unit 108 can specify the imaging device 200 corresponding to the GUI 10A with reference to the display history and cause the communication unit 102 to transmit an image transmission request to the specified imaging device 200. As illustrated in the upper right drawing of FIG. 8, the display control unit 108 can cause the display unit 110 to display the image received from the imaging device 200 corresponding to the GUI 10A and display the GUI 10A as the GUI in the selection state. The display control unit 108 can maintain the state in which the area between the GUI 10A and the GUI 10C is empty.

Next, when the imaging device 200 is additionally connected, the display control unit 108 additionally displays the GUI corresponding to the additionally connected imaging device 200 at the end of the arrangement of the GUIs. For example, as illustrated in the lower left drawing of FIG. 8, when the imaging device 200 is additionally connected, the display control unit 108 displays a GUI 10D corresponding to the additionally connected imaging device 200 after (below) the GUI 10C. At this time, the display control unit 108 does not display the GUI 10D between the GUI 10A and the GUI 10C and can maintain the state in which the area between the GUI 10A and the GUI 10C is opened.

Next, when the imaging device 200 corresponding to the deleted GUI is reconnected, the display control unit 108 redisplays the GUI corresponding to the reconnected imaging device 200 in the area corresponding to the display position of the deleted GUI. For example, when the imaging device 200 corresponding to the deleted GUI 10B is reconnected, the display control unit 108 redisplays the GUI 10B in the area between the GUI 10A and the GUI 10C, as illustrated in the lower middle drawing of FIG. 8.

Next, when the image received from the imaging device 200 has been to be displayed when the connection of the reconnected imaging device 200 is cut off, the display control unit 108 switches the image to be displayed to an image received from the reconnected imaging device 200. For example, referring to the display history, the display control unit 108 can determine whether the image received from the imaging device 200 has been being displayed when the connection of the reconnected imaging device 200 is cut off. When the display control unit 108 determines that the image received from the imaging device 200 has been being displayed when the connection of the reconnected imaging device 200 is cut off, the display control unit 108 causes the communication unit 102 to transmit an image transmission request to the reconnected imaging device 200 corresponding to the GUI 10B. Then, the display control unit 108 causes the display unit 110 to display the image received from the imaging device 200 and to display the GUI 10B as the GUI in the selection state.

Thus, according to the seventh modification example of the embodiment, the display control unit 108 does not display the GUI relevant to another imaging device 200 in the area corresponding to the display position before the deletion of the deleted GUI when the display control unit 108 deletes the GUI corresponding to the disconnected imaging device 200. When the disconnected imaging device 200 is reconnected, the GUI relevant to the reconnected imaging device 200 is displayed in this area. Therefore, by displaying the GUI corresponding to the same imaging device 200 in the area corresponding to the same display position, the user can visually understand that the disconnected imaging device 200 is reconnected.

When the disconnected imaging device 200 is not reconnected and the display area of the GUI is insufficient, the display control unit 108 may display a GUI relevant to another device in the area in which the imaging device 200 was displayed before the deletion. For example, when the deleted imaging device 200 is not reconnected and another imaging device 200 is connected in the state illustrated in the lower left drawing of FIG. 8, the display control unit 108 displays a GUI corresponding to the other imaging device 200 in the area between the GUI 10A and the GUI 10C in which the GUI corresponding to the deleted imaging device 200 was displayed. When the deleted imaging device 200 is not reconnected and another imaging device 200 is connected in the state illustrated in the lower left drawing of FIG. 8, the display control unit 108 moves the GUI 10C and the GUI 10D upward to fill the area between the GUI 10A and the GUI 10C in which the GUI corresponding to the deleted imaging device 200 was displayed. The display control unit 108 may display the GUI corresponding to the other connected imaging device 200 in the lowermost portion of the arrangement of the GUIs. In this case, by effectively utilizing the display area of the GUI while the disconnected imaging device 200 is not reconnected, it is possible to improve convenience for the user.

When the area in which the GUI corresponding to the imaging device 200 was displayed before the deletion is selected through a manipulation performed in the manipulation unit 106, the display control unit 108 may display an image indicating that no image is being displayed. For example, when the area between the GUI 10A and the GUI 10C which are the GUIs in the selection state illustrated in the upper right drawing of FIG. 8 is selected as the GUI in the selection state through a manipulation of the manipulation unit 106 by the user, the display control unit 108 switches the image to be displayed and received from the imaging device 200 corresponding to the GUI 10A to an image indicating that no image is being displayed. Therefore, it can be suggested to the user that it is possible for the GUI to be displayed again in the area in which the GUI was displayed before the deletion.

Eighth Modification Example

As an eighth modification example of the embodiment, the display control unit 108 may display a GUI indicating an operation state of the imaging device 200. Specifically, the display control unit 108 displays a GUI (also referred to as a GUI corresponding to a photographing mode of the imaging device 200) indicating a photographing mode of the imaging device 200. For example, the GUI indicating the photographing mode of the imaging device 200 will be described with reference to FIG. 9A. FIG. 9A is a diagram illustrating an example of a GUI indicating an operation state of the imaging device 200 displayed in the information processing device 100 according to the eighth modification example of the embodiment.

The display control unit 108 acquires photographing mode information of each of the connected imaging devices 200 from each of the imaging devices 200 and causes the display unit 110 to display a GUI indicating the photographing mode based on the acquired photographing mode information. For example, the display control unit 108 can cause the communication unit 102 to transmit a request for transmitting the photographing mode information to each of the connected imaging devices 200. Then, as illustrated in the upper drawing of FIG. 9A, the display control unit 108 can display a GUI 10 indicating a moving image mode and a GUI 12 indicating a still image mode based on the received photographing mode information.

The display control unit 108 displays a GUI indicating that the photographing mode is not confirmed until the photographing mode of the connected imaging device 200 is confirmed. For example, as illustrated in the upper drawing of FIG. 9A, the display control unit 108 can display a GUI 14 indicating that the photographing mode is not confirmed when the photographing mode is not confirmed during the acquisition of the photographing mode. When the display control unit 108 displays the GUI 14, the display control unit 108 can display an object 20 indicating that a communication process is being performed.

When the photographing mode is acquired and confirmed, the display control unit 108 deletes the GUI indicating that the photographing mode is not confirmed and displays a GUI indicating the confirmed photographing mode. For example, as illustrated in the lower drawing of FIG. 9A, when the photographing mode is acquired, the display control unit 108 can display a GUI 16 indicating an acquired interval still image mode. The interval still image mode can be a mode in which a still image is captured at a predetermined time interval. When the display control unit 108 displays the GUI 16, the display control unit 108 can delete the object 20. Thus, the display control unit 108 displays the GUI indicating each photographing mode of the imaging device 200. Therefore, the user can visually comprehend the photographing modes of the connected imaging devices 200, and thus it is possible to improve convenience for the user.

The display control unit 108 displays an object indicating a recording state of the imaging device 200 corresponding to a GUI. Specifically, the display control unit 108 displays an object indicating a recording state when the imaging device 200 corresponding to the GUI indicating the moving image mode is in a recording state. For example, the object indicating the recording state will be described with reference to FIG. 9B. FIG. 9B is a diagram illustrating other example of GUIs indicating operation states of the imaging devices 200 displayed in the information processing device 100 according to the eighth modification example of the embodiment.

First, the display control unit 108 displays a GUI indicating the photographing mode of each of the connected imaging devices 200. For example, as illustrated in the upper drawing of FIG. 9B, the display control unit 108 can display the GUI 10, the GUI 12, and the GUI 14.

Next, when an operation instruction to transition to a recording state is transmitted from the communication unit 102 to the imaging device 200 of which the photographing mode is the moving image mode among the connected imaging devices 200, the display control unit 108 displays an object indicating that a communication process is being performed at a position adjacent to the displayed GUI. For example, when the operation instruction to transition to the recording state is transmitted from the communication unit 102 to the imaging device 200 corresponding to the GUI 10, the display control unit 108 displays the object 20 at a position adjacent to the GUI 10, as illustrated in the upper drawing of FIG. 9B. The display control unit 108 may display an object indicating the recording state in the GUI corresponding to the imaging device 200 of which the photographing mode is a photographing mode other than the moving image mode. For example, the display control unit 108 can display the object indicating the recording state in the GUI corresponding to the imaging device 200 of which the photographing mode is the interval still image mode.

Next, when the communication unit 102 receives information indicating the transition to the recording state from the imaging device 200 to which the operation instruction to transition to the recording state has been transmitted, the display control unit 108 displays the object indicating that the imaging device 200 is in the recording state. For example, when the communication unit 102 receives information indicating the transition to the recording state from the imaging device 200 to which the operation instruction to transition to the recording state has been transmitted, the display control unit 108 displays an object 30 indicating that the imaging device 200 corresponding to the GUI 10 is in the recording state so that the object 30 is superimposed on the GUI 10. The display control unit 108 can delete the object 30 when the imaging device 200 corresponding to the GUI 10 is not in the recording state.

Thus, the display control unit 108 displays the object indicating the recording state of the imaging device 200 corresponding to the GUI. Therefore, the user can visually comprehend the recording state of the imaging device 200. Further, when the imaging device 200 corresponding to the GUI indicating the moving image mode is in the recording state, the display control unit 108 displays the object indicating the recording state. Therefore, the user can visually comprehend that a moving image is being recorded.

When a communication process ends abnormally, the display control unit 108 may display a GUI indicating that the communication process ends abnormally. Specifically, when a response to an operation instruction transmitted to the imaging device 200 by the communication unit 102 is an error indicating that the operation instruction is not executable, the display control unit 108 displays a GUI indicating that the error occurs in the imaging device 200. When the communication unit 102 fails in the communication with the imaging device 200, the display control unit 108 displays a GUI indicating that a communication failure occurs. For example, a GUI relevant to an error will be described with reference to FIG. 9B.

First, when the communication unit 102 transmits an operation instruction or the like to the imaging device 200, the display control unit 108 displays an object indicating that a communication process is being performed at a position adjacent to the GUI corresponding to the imaging device 200. For example, as illustrated in the upper drawing of FIG. 9B, the display control unit 108 can display the objects 20 at positions adjacent to the GUI 12 and the GUI 14 corresponding to the imaging devices 200 to which the operation instruction or the like has been transmitted.

Next, when responses to errors indicating that the operation instruction is not executable are received from the imaging devices 200 to which the operation instruction or the like has been transmitted, the display control unit 108 switches the GUIs corresponding to the imaging devices 200 with GUIs indicating that the error occurs in the imaging devices 200. For example, when the response to the error indicating that the operation instruction is not executable is received from the imaging device 200 which corresponds to the GUI 12 and to which the operation instruction or the like has been transmitted, the display control unit 108 switches the GUI 12 to a GUI 40, as illustrated in the lower drawing of FIG. 9B. Further, when the communication with the imaging device 200 to which the operation instruction or the like has been transmitted fails, the display control unit 108 switches the GUI corresponding to the imaging device 200 to a GUI indicating that the communication fails. For example, when the communication with the imaging device 200 which corresponds to the GUI 14 and to which the operation instruction or the like has been transmitted fails, the display control unit 108 switches the GUI 14 to a GUI 42, as illustrated in the lower drawing of FIG. 9B.

The display control unit 108 can blink a GUI indicating a communication process abnormally ends for a predetermined time or at intervals of a predetermined time. For example, the display control unit 108 can blink the GUI 40 and the GUI 42 for 5 seconds and at 3.2 Hz. While the display control unit 108 blinks the GUIs indicating the abnormal end, the display control unit 108 may remain displaying the objects 20. After the display control unit 108 ends the blinking, the display control unit 108 may return the GUIs indicating the abnormal end to the GUIs before switching.

Thus, when the communication process ends abnormally, the display control unit 108 displays the GUI indicating that the communication process ends abnormally. Therefore, the user can visually comprehend an operation result of the communication process.

When the connected imaging device 200 enters a photographing-disabled state, the display control unit 108 may switch the GUI corresponding to the imaging device 200 to a GUI indicating the photographing-disabled state. For example, a GUI indicating a photographing-disabled state will be described with reference to FIG. 9C. FIG. 9C is a diagram illustrating still other examples of GUIs and other GUIs indicating operation states of the imaging devices 200 displayed in the information processing device 100 according to the eighth modification example of the embodiment.

When the storage capacity of a recording medium of the connected imaging device 200 is exhausted and the communication unit 102 receives information indicating that the storage capacity of the recording medium is exhausted from that imaging device 200, the display control unit 108 switches the GUI corresponding to the imaging device 200 to a GUI 50 indicating a photographing-disabled state, as illustrated in FIG. 9C. Therefore, the user can visually comprehend a photographing possibility of the imaging device 200.

Thus, according to the eighth modification example of the embodiment, the display control unit 108 displays a GUI indicating the operation state of each of the imaging devices 200. Therefore, by visualizing the operation states of the imaging devices 200, the user can visually comprehend the operation states, and thus it is possible to improve convenience.

When a device not corresponding to the information processing device 100 is connected, the display control unit 108 may display a GUI indicating that the connected device does not correspond to the information processing device 100. For example, as illustrated in FIG. 9C, when a device not corresponding to the information processing device 100 is connected, the display control unit 108 can display a GUI 50 indicating that the device does not correspond to the information processing device 100. Therefore, the user can quickly determine whether the connected imaging device 200 corresponds to the information processing device 100.

Ninth Modification Example

As a ninth modification example of the embodiment, the communication unit 102 may transmit an operation instruction indicating transition to a recording state to each of the imaging devices 200 in other photographing modes. For example, the foregoing process will be described with reference to FIG. 10. FIG. 10 is a diagram illustrating a change in a display screen relevant to an operation instruction to transition to a recording state of the information processing device 100 according to a ninth modification example of the embodiment.

First, the display control unit 108 causes the display unit 110 to display the GUI corresponding to each of the connected imaging devices 200. For example, as illustrated in the upper left drawing of FIG. 10, the display control unit 108 can display the GUI 10A to the GUI 10C corresponding to the imaging devices 200 in the moving image mode and the GUI 12 corresponding to the imaging device 200 in the still image mode.

Next, the communication unit 102 transmits an operation instruction to transition to the recording state to the imaging device 200 of which the photographing mode is a predetermined mode based on a user manipulation. The display control unit 108 displays an object indicating that the communication process is being performed at a position adjacent to the GUI corresponding to the imaging device 200 to which the transition operation instruction has been transmitted. For example, the communication unit 102 can transmit an operation instruction to transition to the recording state to the imaging device 200 of which the photographing mode is the moving image mode or the still image mode based on a recording instruction manipulation performed on the imaging device 200 in the manipulation unit 106. As illustrated in the upper middle drawing of FIG. 10, the display control unit 108 can display the object 20 at a position adjacent to each of the GUI 10A to the GUI 10C and the GUI 12 corresponding to the imaging devices 200 to which the operation instruction has been transmitted. The predetermined mode may be an interval still image mode or may be set by the user.

Next, the imaging device 200 receiving the operation instruction allows the operation state of the imaging device 200 to transition to the recording state and transmits information indicating the transition to the recording state to the information processing device 100. For example, the operation control unit 204 can allow the imaging device 200 to transition to the recording state in response to the received operation instruction and start the imaging of the imaging unit 206. The operation control unit 204 can cause the communication unit 202 to transmit a response indicating the transition to the recording state to the information processing device 100. When the imaging device 200 in the still image mode receives the instruction to transition to the recording state, the operation control unit 204 causes the imaging unit 206 to perform the imaging only once and causes the communication unit 202 to transmit information indicating that the imaging is performed to the information processing device 100.

Next, when the communication unit 102 receives the response indicating the transition to the recording state, the display control unit 108 displays an object indicating the recording state on the GUI corresponding to the imaging device 200 in the moving image mode. For example, when the communication unit 102 receives the response indicating the transition to the recording state, the display control unit 108 displays an object 30 indicating the recording states so that the object 30 is superimposed on each of the GUI 10A to the GUI 10C corresponding to the imaging devices 200 relevant to the response, as illustrated in the upper right drawing of FIG. 10, and deletes the objects 20 indicating that the communication process is being performed. The display control unit 108 does not display the object 30 on the GUI corresponding to the imaging device 200 in the still image mode.

Next, the communication unit 102 transmits an operation instruction to transition to a recording stop state to the imaging device 200 of which the photographing mode is a predetermined mode based on a user manipulation. The display control unit 108 displays the object indicating that the communication process is being performed at a position adjacent to the GUI corresponding to the imaging device 200 to which the transition operation instruction has been transmitted. For example, the communication unit 102 can transmit the operation instruction to transition to the recording stop state to the imaging device 200 of which the photographing mode is the moving image mode or the still image mode based on a recording stop instruction manipulation performed on the imaging device 200 in the manipulation unit 106. As illustrated in the upper middle drawing of FIG. 10, the display control unit 108 can display the object 20 at a position adjacent to each of the GUI 10A to the GUI 10C and the GUI 12 corresponding to the imaging devices 200 to which the operation instruction has been transmitted.

Next, the imaging device 200 receiving the operation instruction allows the operation state of the imaging device 200 to transition to the recording stop state and transmits information indicating the transition to the recording stop state to the information processing device 100. For example, the operation control unit 204 can allow the imaging device 200 to transition to the recording stop state in response to the received operation instruction and can end the imaging of the imaging unit 206. The operation control unit 204 can cause the communication unit 202 to transmit a response indicating the transition to the recording stop state to the information processing device 100. When the imaging device 200 in the still image mode receives the instruction to transition to the recording stop state, the operation control unit 204 causes the imaging unit 206 to perform the imaging only once and causes the communication unit 202 to transmit information indicating that the imaging is performed to the information processing device 100.

Next, when the communication unit 102 receives the response indicating the transition to the recording stop state, the display control unit 108 deletes an object indicating the recording state. For example, when the communication unit 102 receives the response indicating the transition to the recording stop state, the display control unit 108 deletes the object 30 indicating the recording states and displayed on each of the GUI 10A to the GUI 10C corresponding to the imaging devices 200 relevant to the response, as illustrated in the lower right drawing of FIG. 10, and deletes the objects 20 indicating that the communication process is being performed.

Thus, according to the ninth modification example of the embodiment, the communication unit 102 transmits the operation instruction indicating the transition to the recording state to each of the imaging devices 200 in another photographing mode. Therefore, the user can manipulate the imaging devices 200 without performing a recording instruction manipulation for each photographing mode, and thus it is possible to improve convenience for the user.

The example in which the communication unit 102 transmits the operation instruction to transition to the recording state to the imaging device 200 in a predetermined photographing mode has been described above. However, the communication unit 102 may transmit the operation instruction to transition to the recording state to all of the imaging devices 200. In this case, the imaging devices 200 receiving the transition operation instruction determine whether a photographing mode is the predetermined photographing mode. When it is determined that the photographing mode is the predetermined photographing mode, the imaging device 200 allows the operation state to transition to the recording state. Therefore, a process of determining the photographing mode in the information processing device 100 can be omitted, and thus it is possible to realize a reduction in a processing load of the information processing device 100 and an improvement in a processing speed.

Tenth Modification Example

As a tenth modification example of the embodiment, when a manipulation of unifying the photographing modes of a plurality of connected devices to one photographing mode is performed, the display control unit 108 may change GUIs corresponding to the plurality of connected devices to a GUI indicating the photographing mode relevant to the manipulation. For example, the foregoing process will be described with reference to FIG. 11. FIG. 11 is a diagram illustrating a change in a display screen relevant to a photographing-mode collective changing process of the information processing device 100 according to a tenth modification example of the embodiment.

First, the display control unit 108 causes the display unit 110 to display the GUI corresponding to each of the connected imaging devices 200. For example, as illustrated in the upper left drawing of FIG. 11, the display control unit 108 can display the GUI 10A to the GUI 10C corresponding to the imaging devices 200 in the moving image mode and the GUI 12 corresponding to the imaging device 200 in the still image mode.

Next, when the user performs a manipulation of displaying a photographing mode setting screen, the display control unit 108 displays the photographing mode setting screen. For example, when the user manipulates the manipulation unit 106 to display the photographing mode setting screen, the display control unit 108 displays the screen illustrated in the upper right drawing of FIG. 11. For example, the GUI 12 indicating the still image mode, the GUI 10 indicating the moving image mode, and the GUI 16 indicating the interval still image mode can be displayed on the display screen.

Next, when the user performs a manipulation of setting a photographing mode, the communication unit 102 transmits an operation instruction to allow the photographing mode to transition to the photographing mode relevant to the setting manipulation to the imaging device 200 of which a photographing mode is not the photographing mode relevant to the setting manipulation. The display control unit 108 erases the photographing mode setting screen, returns the display screen to the original display screen, and displays the object indicating that the communication process is being performed at a position adjacent to the GUI corresponding to the imaging device 200 to which the operation instruction has been transmitted. For example, when the user manipulates the manipulation unit 106 to set the photographing mode to the moving image mode, the communication unit 102 determines whether the photographing mode of each of the connected imaging devices 200 is the moving image mode. The communication unit 102 transmits the operation instruction to allow the photographing mode to transition to the moving image mode to the imaging device 200 of which the photographing mode is the still image mode. When the user manipulates the manipulation unit 106 to set the photographing mode to the moving image mode, the display control unit 108 erases the photographing mode setting screen and displays the original display screen, as illustrated in the lower left drawing of FIG. 11. The display control unit 108 displays the object 20 indicating that the communication process is being performed at a position adjacent to the GUI 12 corresponding to the imaging device 200 to which the operation instruction has been transmitted.

Next, the imaging device 200 receiving the operation instruction sets the photographing mode of the imaging device 200 to the photographing mode relevant to the operation instruction and transmits information indicating a change in the photographing mode to the information processing device 100. For example, the operation control unit 204 can change the photographing mode of the imaging device 200 to the moving image mode in response to the received operation instruction. The operation control unit 204 can allow the communication unit 202 to transmit a response indicating the change to the moving image mode to the information processing device 100.

Next, when the communication unit 102 receives the response indicating the change in the photographing mode, the display control unit 108 changes the GUI corresponding to the imaging device 200 relevant to the response to a GUI indicating the photographing mode relevant to the operation instruction. The display control unit 108 deletes the object indicating that the communication process is being performed. For example, when the communication unit 102 receives the response indicating the transition to the moving image mode, the display control unit 108 changes the GUI 12 corresponding to the imaging device 200 relevant to the response to the GUI 10D indicating the moving image mode illustrated in the lower right drawing of FIG. 11. The display control unit 108 deletes the object 20 indicating that the communication process is being performed.

Thus, according to the tenth modification example of the embodiment, when the manipulation of unifying the photographing modes of the plurality of connected devices to one photographing mode is performed, the display control unit 108 changes the GUIs corresponding to the plurality of connected devices to the GUI indicating the photographing mode relevant to the manipulation. Therefore, by collectively changing the photographing modes of the imaging devices 200 of which the photographing modes are desired to be changed by the user, it is possible to reduce complexity of the user manipulation.

3. HARDWARE CONFIGURATION OF INFORMATION PROCESSING DEVICE ACCORDING TO EMBODIMENT OF THE PRESENT DISCLOSURE

The embodiments of the present disclosure have been described above. The processes of the information processing device 100 described above are realized through cooperation of software and the hardware of the information processing device 100 to be described below.

FIG. 12 is an explanatory diagram illustrating a hardware configuration of the information processing device 100 according to an embodiment of the present disclosure. As illustrated in FIG. 12, the information processing device 100 includes a central processing unit (CPU) 132, a read-only memory (ROM) 134, a random access memory (RAM) 136, a bridge 138, a bus 140, an interface 142, an input device 144, an output device 146, a storage device 148, a connection port 150, and a communication device 152.

The CPU 132 functions as an arithmetic processing device and a control device and realizes an operation of the display control unit 108 in the information processing device 100 in cooperation with various programs. The CPU 132 may be a microprocessor. The ROM 134 stores programs, arithmetic parameters, and the like used by the CPU 132. The RAM 136 temporarily stores programs used in execution of the CPU 132 or parameters or the like properly changed in execution thereof. A part of the storage unit 104 in the information processing device 100 is realized by the ROM 134 and the RAM 136. The CPU 132, the ROM 134, and the RAM 136 are mutually connected by an internal bus configured by a CPU bus or the like.

The input device 144 is an example of the manipulation unit 106 of the information processing device 100 and is configured to include an input unit, such as a mouse, a keyboard, a touch panel, a button, a microphone, a switch, and a lever, used for the user to input information and an input control circuit generating an input signal based on an input by the user and outputting the input signal to the CPU 132. The user of the information processing device 100 can input various kinds of data or can give an instruction of a processing operation to the information processing device 100 by manipulating the input device 144.

The output device 146 is an example of the display unit 110 of the information processing device 100 and outputs information to, for example, a device such as a liquid crystal display (LCD) device, an organic light emitting diode (OLED) device, or a lamp. The output device 146 may output an audio of a speaker, a headphone, and the like.

The storage device 148 is a device that stores data. The storage device 148 may include a storage medium, a recording device recording data on a storage medium, a reading device reading data from a storage medium, or a deletion device deleting data recorded on a storage medium. The storage device 148 stores programs executed by the CPU 132 or various kinds of data.

The connection port 150 is, for example, a bus connected to an external information processing process or a peripheral device of the information processing device 100. The connection port 150 may be a Universal Serial Bus (USB).

The communication device 152 is an example of the communication unit 102 of the information processing device 100 and is, for example, a communication interface configured by a communication device connected to a network. The communication device 152 may be a device corresponding to infrared communication, may be a communication device corresponding to a wireless local area network (LAN), may be a communication device corresponding to Long Term Evolution (LTE), or may be a wired communication device performing communication in a wired manner.

4. CONCLUSION

According to an embodiment of the present disclosure, by automatically switching the imaging device 200 transmitting an image to be displayed, it is possible to prevent the display of the image from being stopped.

The preferred embodiments of the present disclosure have been described in detail with reference to the appended drawings, but the technical scope of the present disclosure is not limited to the examples. It should be understood by those skilled in the art that various modifications, combinations, sub-combinations and alterations may occur depending on design requirements and other factors insofar as they are within the scope of the appended claims or the equivalents thereof.

The advantageous effects described in the present specification are merely descriptive and exemplary, and thus are not restrictive. That is, according to an embodiment of the technology related to the present disclosure, it is possible to obtain other advantageous effects apparent those skilled in the art along with the foregoing advantageous effects or instead of the foregoing advantageous effects from the description of the present embodiments.

[A001] A method for receiving images by an information processing device that is connected to a plurality of imaging devices, the plurality of imaging devices including a first imaging device and a second imaging device, comprising: displaying a first image captured by the first imaging device; and switching to a second image captured by the second imaging device, the switching occurring at a time that the first image is not received by the information processing device.

[A002] The method according to [A001], wherein the second imaging device is connected to the information processing device immediately before the first imaging device.

[A003] The method according to [A001], wherein a third image captured by the second imaging device is displayed by the information processing device immediately before the first image.

[A004] The method according to [A001], wherein the second imaging device has a display time longer than one or more of the plurality of imaging devices.

[A005] The method according to [A004], wherein the display time includes a sum of display continuity time.

[A006] The method according to [A001], wherein the second imaging device has a longer connection time to the information processing device than one or more of the plurality of imaging devices.

[A007] The method according to [A001], wherein the second imaging device corresponds to a higher radio wave intensity than one or more of the plurality of imaging devices.

[A008] The method according to [A001], further comprising displaying an object indicating that a communication process is being performed between one of the plurality of imaging devices and the information processing device.

[A009] The method according to [A001], further comprising prompting a display of a plurality of icons respectively corresponding to the plurality of imaging devices.

[A010] The method according to [A009], wherein the second imaging device was chosen by selecting an icon among the plurality of icons that corresponds to the second imaging device.

[A011] The method according to [A009], further comprising prompting the display of identification numbers respectively corresponding to the plurality of icons.

[A012] The method according to [A011], wherein one of the plurality of icons is removed from the display when a corresponding imaging device is disconnected from the information processing device.

[A013] The method according to [A012], wherein the one of the plurality of icons is reintroduced to the display when the corresponding imaging device is reconnected to the information processing device.

[A014] The method according to [A009], wherein the display of plurality of icons changes according to mode information provided by the plurality of imaging devices.

[A015] The method according to [A009], wherein when a new imaging device is added to the plurality of imaging devices, a new icon is added to the display of the plurality of icons.

[A016] The method according to [A001], wherein the information processing device is one of a smartphone, a tablet, a digital camera, a portable game device, and a personal digital assistant.

[A017] An information processing device, which is connected to a plurality of imaging devices including a first imaging device and a second imaging device, comprising: a display unit configured to display a first image captured by the first imaging device and a plurality of icons respectively corresponding to the plurality of imaging devices, wherein the display unit is configured to switch to a second image captured by the second imaging device at a time that the first image is not received by the information processing device.

[A018] The information processing device according to [A017], further comprising a storage unit configured to store at least one of display history and communication connection history.

[A019] The information processing device according to [A017], wherein the display unit is configured to display an icon indicating an imaging device transmitting an image to be displayed.

[A020] The information processing device according to [A017], wherein the display unit deletes one of the plurality of icons when one of the plurality of imaging devices is disconnected from the information processing device.

(1) An information processing device including: a communication unit configured to receive images from a plurality of connected devices; and a display control unit configured to display the images received by the communication unit, wherein the display control unit switches an image to be displayed to an image received from a device specified from a history based on communication among the plurality of devices when the image to be displayed is not received by the communication unit.

(2) The information processing device according to (1), wherein the specified device is specified based on a display history of the received images.

(3) The information processing device according to (2), wherein the specified device is a device transmitting an image displayed before an image not received by the communication unit is displayed.

(4) The information processing device according to (2), wherein the specified device is a device transmitting an image having a longer display time than another image does.

(5) The information processing device according to (1), wherein the specified device is specified based on a communication connection history.

(6) The information processing device according to (5), wherein the specified device is a device having a longer connection time than another device does.

(7) The information processing device according to (5), wherein the specified device is a device having higher radio wave intensity than another device does.

(8) The information processing device according to any one of (1) to (7), further including: a manipulation unit configured to receive a manipulation performed by a user, wherein the display control unit displays a GUI selected in response to the manipulation performed in the manipulation unit and corresponding to each of the connected devices, and switches the image to be displayed to an image transmitted by one of the device relevant to the selected GUI.

(9) The information processing device according to (8), wherein, when a GUI relevant to a disconnected device is deleted, the display control unit does not display a GUI relevant to another device in an area corresponding to a display position before the deletion of the deleted GUI, and when the disconnected device is reconnected, the display control unit displays a GUI relevant to the reconnected device in the area.

(10) The information processing device according to (9), wherein, when the disconnected device is not reconnected and a display area of the GUI is insufficient, the display control unit allows a GUI relevant to another device to be displayed in the area.

(11) The information processing device according to any one of (8) to (10), wherein the display control unit displays a device relevant to a GUI in a manner that the device is identifiable.

(12) The information processing device according to any one of (8) to (11), wherein the GUI indicates an operation state of the device relevant to the GUI.

(13) The information processing device according to any one of (8) to (12), wherein the display control unit displays an object indicating that a communication process is being performed near a GUI relevant to a device which is performing the communication process.

(14) The information processing device according to any one of (8) to (13), wherein the display control unit displays a GUI in a manner that a device transmitting an image to be displayed is indicated.

(15) The information processing device according to any one of (8) to (14), wherein the GUI is displayed at a position adjacent to the manipulation unit.

(16) The information processing device according to any one of (8) to (15), wherein the display control unit arranges and displays the GUIs in an order in which the devices are connected.

(17) An information processing method including: receiving images from a plurality of connected devices; displaying the received images; and switching an image to be displayed to an image received from a device specified from a history based on communication among the plurality of devices when the image to be displayed is not received.

(18) A program for causing a computer to realize: a communication function of receiving images from a plurality of connected devices; and a display control function of displaying the images received by the communication function and switching an image to be displayed to an image received from a device specified from a history based on communication among the plurality of devices when the image to be displayed is not received by the communication function.

The following configurations also pertain to the technical scope of an embodiment of the present disclosure.

(A) An information processing device includes a communication unit configured to perform communication with a plurality of connected devices and a display control unit configured to display a GUI indicating a photographing mode of each of the plurality of connected devices.

(B) In the information processing device described in the foregoing (A), the communication unit receives images from the plurality of devices and the display control unit displays the images received by the communication unit and displays the GUIs so that the GUIs are superimposed on the images.

(C) In the information processing device described in the foregoing (B), the display control unit displays the GUI so that the device transmitting the image to be displayed is indicated.

(D) In the information processing device described in the foregoing (C), the display control unit displays a background of a display area of the GUI corresponding to the device transmitting the image to be displayed so that the background is different from backgrounds of display areas of the other GUIs.

(E) In the information processing device described in the foregoing (D), the display control unit allows the background of the display area of the GUI corresponding to the device transmitting the image to be displayed to be opaque.

(F) In the information processing device described in the foregoing (D), the display control unit displays a background color of the display area of the GUI corresponding to the device transmitting the image to be displayed in a different color from background colors of the display areas of the other GUIs.

(G) In the information processing device described in any one of the foregoing (A) to (F), the display control unit displays an object indicating a recording state of the device corresponding to the GUI.

(H) In the information processing device described in the foregoing (G), when the device corresponding to a GUI indicating a moving image mode is in a recording state, the display control unit displays the object indicating the recording state.

(I) In the information processing device described in any one of the foregoing (A) to (H), the display control unit displays a GUI indicating that a photographing mode is not confirmed until the photographing mode of the connected device is confirmed.

(J) In the information processing device described in any one of the foregoing (A) to (I), the display control unit displays an object indicating that a communication process is being performed near the GUI corresponding to the device which is performing the communication process.

(K) In the information processing device described in any one of the foregoing (A) to (J), the display control unit arranges and displays the GUIs in an order in which the devices are connected.

(L) In the information processing device described in any one of the foregoing (A) to (K), the display control unit deletes the GUI corresponding to the disconnected device.

(M) In the information processing device described in any one of the foregoing (B) to (F), when the communication unit does not receive the image to be displayed, the display control unit switches the image to be displayed to an image received from the device specified from a history based on communication among the plurality of devices.

(N) In the information processing device described in any one of the foregoing (A) to (M), the display control unit changes the GUI corresponding to the device of which the photographing mode is changed to a GUI indicating the changed photographing mode.

(O) The information processing device described in any one of the foregoing (A) to (N) further includes a manipulation unit manipulated by a user. When the user manipulates the manipulation unit to unify the photographing modes of the plurality of connected devices to one photographing mode, the display control unit changes the GUIs corresponding to the plurality of connected devices to a GUI indicating the one photographing mode.

(P) In the information processing device described in any one of the foregoing (A) to (O), the display control unit displays the devices relevant to the GUIs so that the devices are identifiable.

(Q) An information processing method includes performing communication with a plurality of connected devices and displaying a GUI indicating a photographing mode of each of the plurality of connected devices.

(R) A program causes a computer to realize a communication function of performing communication with a plurality of connected devices and a display control function of displaying a GUI indicating a photographing mode of each of the plurality of connected devices.

REFERENCE SIGNS LIST 100 information processing device
102 communication unit
102 storage unit
106 manipulation unit
108 display control unit
200 imaging device

What is claimed is:

1. A method for receiving images by an information processing device that is connected to a plurality of imaging devices, the plurality of imaging devices including a first imaging device and a second imaging device, comprising:
   storing, in a memory of the information processing device, history information respectively corresponding to each of the plurality of imaging devices;
   receiving, by the information processing device, a first image captured by the first imaging device;
   displaying, by a display of the information processing device, the first image captured by the first imaging device; and
   upon a determination that the first image is no longer being received by the information processing device, and in an absence of user input specifying a next image, switching the display by the display to a second image captured by the second imaging device, the switching to the second image captured by the second imaging device being based upon the history information stored in the memory of the information processing device,
   wherein the switching is determined based upon the history information indicating that the second imaging device satisfies a predetermined condition, and
   wherein the predetermination condition is the history information indicating that the second imaging device is the one the plurality of imaging devices that had been connected to the information processing device immediately before the first imaging device.

2. The method according to claim 1, further comprising displaying an object indicating that a communication process is being performed between one of the plurality of imaging devices and the information processing device.

3. The method according to claim 1, further comprising prompting a display of a plurality of icons respectively corresponding to the plurality of imaging devices.

4. The method according to claim 3, wherein the predetermined condition is the second imaging device being chosen via selection of an icon among the plurality of icons that corresponds to the second imaging device.

5. The method according to claim 3, further comprising prompting the display of identification numbers respectively corresponding to the plurality of icons.

6. The method according to claim 5, wherein one of the plurality of icons is removed from the display when a corresponding imaging device is disconnected from the information processing device.

7. The method according to claim 6, wherein the one of the plurality of icons is reintroduced to the display when the corresponding imaging device is reconnected to the information processing device.

8. The method according to claim 3, wherein the display of the plurality of icons changes according to mode information provided by the plurality of imaging devices.

9. The method according to claim 3, wherein when a new imaging device is added to the plurality of imaging devices, a new icon is added to the display of the plurality of icons.

10. The method according to claim 1, wherein the information processing device is one of a smartphone, a tablet, a digital camera, a portable game device, and a personal digital assistant.

11. A method for receiving images by an information processing device that is connected to a plurality of imaging devices, the plurality of imaging devices including a first imaging device and a second imaging device, comprising:
storing, in a memory of the information processing device, history information respectively corresponding to each of the plurality of imaging devices;
receiving, by the information processing device, a first image captured by the first imaging device;
displaying, by a display of the information processing device, the first image captured by the first imaging device; and
upon a determination that the first image is no longer being received by the information processing device, and in an absence of user input specifying a next image, switching the display by the display to a second image captured by the second imaging device, the switching to the second image captured by the second imaging device being based upon the history information stored in the memory of the information processing device,
wherein the switching is determined based upon the history information indicating that the second imaging device satisfies a predetermined condition, and
wherein the predetermined condition is the history information indicating that the second imaging device has a display time longer than one or more of the plurality of imaging devices.

12. The method according to claim 11, wherein the display time includes a sum of display continuity time.

13. A method for receiving images by an information processing device that is connected to a plurality of imaging devices, the plurality of imaging devices including a first imaging device and a second imaging device, comprising:
storing, in a memory of the information processing device, history information respectively corresponding to each of the plurality of imaging devices;
receiving, by the information processing device, a first image captured by the first imaging device;
displaying, by a display of the information processing device, the first image captured by the first imaging device; and
upon a determination that the first image is no longer being received by the information processing device, and in an absence of user input specifying a next image, switching the display by the display to a second image captured by the second imaging device, the switching to the second image captured by the second imaging device being based upon the history information stored in the memory of the information processing device,
wherein the switching is determined based upon the history information indicating that the second imaging device satisfies a predetermined condition, and
wherein the predetermined condition is the history information indicating that the second imaging device has a longer connection time to the information processing device than one or more of the plurality of imaging devices.

14. A method for receiving images by an information processing device that is connected to a plurality of imaging devices, the plurality of imaging devices including a first imaging device and a second imaging device, comprising:
storing, in a memory of the information processing device, history information respectively corresponding to each of the plurality of imaging devices;
receiving, by the information processing device, a first image captured by the first imaging device;
displaying, by a display of the information processing device, the first image captured by the first imaging device; and
upon a determination that the first image is no longer being received by the information processing device, and in an absence of user input specifying a next image, switching the display by the display to a second image captured by the second imaging device, the switching to the second image captured by the second imaging device being based upon the history information stored in the memory of the information processing device,
wherein the switching is determined based upon the history information indicating that the second imaging device satisfies a predetermined condition, and
wherein the predetermined condition is the history information indicating that the second imaging device corresponds to a higher radio wave intensity than one or more of the plurality of imaging devices.

15. An information processing device configured for connection to a plurality of imaging devices including a first imaging device and a second imaging device, the information processing device comprising:
a memory configured to store history information respectively corresponding to each of the plurality of imaging devices to which the information processing device is connected;
communication circuitry configured to receive a first image captured by the first imaging device;
a display configured to display the first image captured by the first imaging device and a plurality of icons respectively corresponding to the plurality of imaging devices; and
a controller configured to, upon a determination that the first image is no longer being received by the communication circuitry, switch the display to a second image captured by the second imaging device, the switch to the second image captured by the second imaging device being based upon the history information stored in the memory,
wherein the switch of the display to the second image is determined based upon the history information indicating that the second imaging device satisfies a predetermined condition, and
wherein the predetermination condition is the history information indicating that the second imaging device is the one the plurality of imaging devices that had been connected to the information processing device immediately before the first imaging device.

16. The information processing device according to claim 15, wherein the history information includes at least one of display history and communication connection history.

17. The information processing device according to claim 15, wherein the display is configured to display an icon indicating an imaging device transmitting an image to be displayed.

18. The information processing device according to claim 15, wherein the display deletes one of the plurality of icons when one of the plurality of imaging devices is disconnected from the information processing device.

\* \* \* \* \*